(12) United States Patent
Holme

(10) Patent No.: US 9,586,137 B2
(45) Date of Patent: Mar. 7, 2017

(54) METHOD AND SYSTEM FOR IMPROVING BODILY DEXTERITY

(75) Inventor: Søren Holme, Brønshøj (DK)

(73) Assignee: Embodify ApS, Brønshøj (DK)

( * ) Notice: Subject to any disclaimer, the term of this patent is extended or adjusted under 35 U.S.C. 154(b) by 14 days.

(21) Appl. No.: 14/399,020

(22) PCT Filed: Sep. 12, 2012

(86) PCT No.: PCT/DK2012/000099
§ 371 (c)(1),
(2), (4) Date: Nov. 25, 2014

(87) PCT Pub. No.: WO2013/167126
PCT Pub. Date: Nov. 14, 2013

(65) Prior Publication Data
US 2015/0119122 A1    Apr. 30, 2015

(30) Foreign Application Priority Data

May 7, 2012    (DK) .................................. 2012 00313

(51) Int. Cl.
*A63F 9/24*         (2006.01)
*A63F 13/212*       (2014.01)
*A63F 13/28*        (2014.01)
*A63F 13/211*       (2014.01)
*A63F 13/245*       (2014.01)
*A63F 13/218*       (2014.01)

(52) U.S. Cl.
CPC .......... *A63F 13/212* (2014.09); *A63F 13/211* (2014.09); *A63F 13/245* (2014.09);
(Continued)

(58) Field of Classification Search
CPC ...... A63F 13/02; A63F 13/212; A63F 13/245; A63F 13/211; A63F 13/06;
(Continued)

(56) References Cited

U.S. PATENT DOCUMENTS 5,950,202 A       9/1999  Durward et al.
9,141,087 B2 *    9/2015  Brown .................... G04F 10/00
(Continued)

FOREIGN PATENT DOCUMENTS

EP    1029569       8/2000
EP    1852163 A2    11/2007
(Continued)

OTHER PUBLICATIONS

Fiedler, "What every programmer needs to know about game networking", gafferongames.com, Jan. 24, 2010, XP002696428, Retrieved from the Internet: URL:http://gafferongames.com/networking-for-game-programmers/what-every-programmer-needs-to-know-about-game-networking/[retrieved on May 2, 2013].

*Primary Examiner* — Corbett B Coburn
(74) *Attorney, Agent, or Firm* — Posternak Blankstein & Lund LLP

(57) ABSTRACT

A system for improving bodily dexterity includes a plurality of wearable sensor units and a processing unit. The plurality of wearable sensor units each include a sensor for sensing a user action, a generating module for generating an action signal that includes information about the user action, and a sensor transmitter for transmitting the action signal. The processing unit includes a processing unit receiver for receiving the action signal, an interpretation module for interpreting the action signal in accordance with a set of pre-assigned criteria, and an output signal generator for generating an output signal based on the interpreted action signal.

22 Claims, 15 Drawing Sheets

(52) U.S. Cl.
CPC ............ *A63F 13/28* (2014.09); *A63F 13/218* (2014.09); *A63F 2300/105* (2013.01); *A63F 2300/1012* (2013.01); *A63F 2300/1037* (2013.01); *A63F 2300/1068* (2013.01); *A63F 2300/30* (2013.01); *A63F 2300/8047* (2013.01)

(58) Field of Classification Search
CPC ...... A63F 2300/1012; A63F 2300/1037; A63F 2300/105; A63F 2300/8047
See application file for complete search history.

(56) References Cited

U.S. PATENT DOCUMENTS

| | | | |
|---|---|---|---|
| 2004/0150675 | A1 | 8/2004 | Chen et al. |
| 2009/0047645 | A1* | 2/2009 | Dibenedetto ..... H04M 1/72563 434/258 |
| 2010/0041454 | A1* | 2/2010 | Huang .................... A63F 13/00 463/7 |
| 2010/0176952 | A1* | 7/2010 | Bajcsy .................... A61B 5/11 340/573.1 |
| 2010/0271302 | A1 | 10/2010 | Pering et al. |
| 2014/0031123 | A1* | 1/2014 | Sarrafzadeh ............ A63F 13/06 463/36 |
| 2014/0066816 | A1* | 3/2014 | McNames .............. A61B 5/002 600/595 |

FOREIGN PATENT DOCUMENTS

| | | |
|---|---|---|
| WO | WO01/28416 | 4/2001 |
| WO | WO 2004/093490 A1 | 10/2004 |
| WO | WO2008/061023 | 5/2008 |

\* cited by examiner

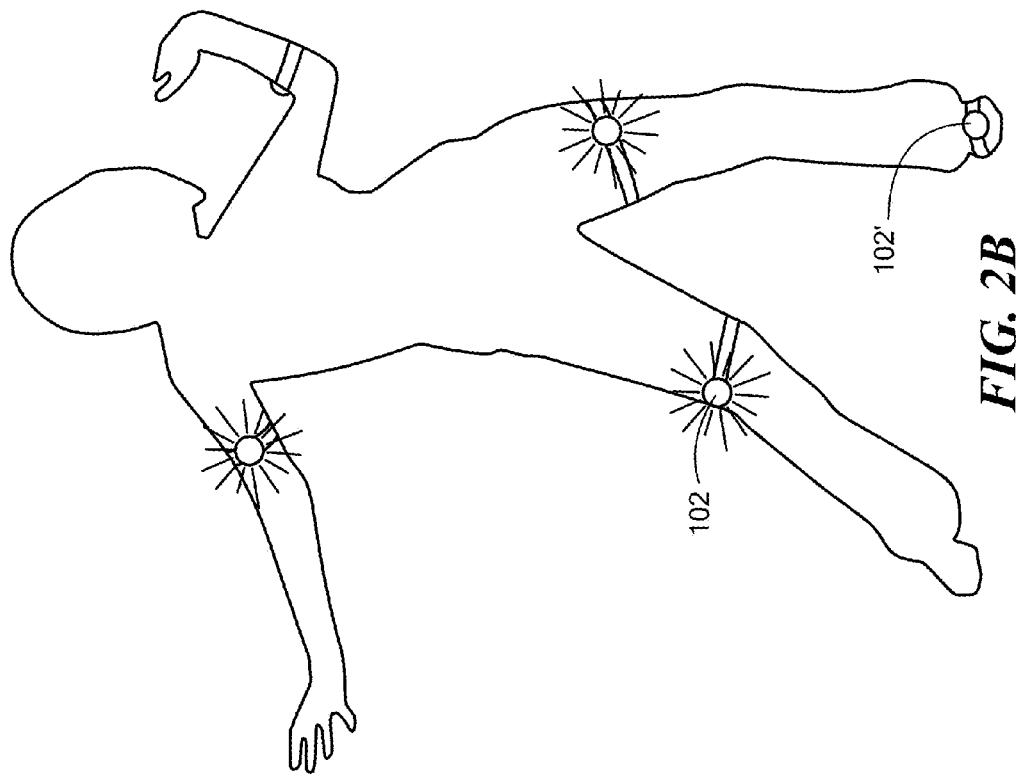
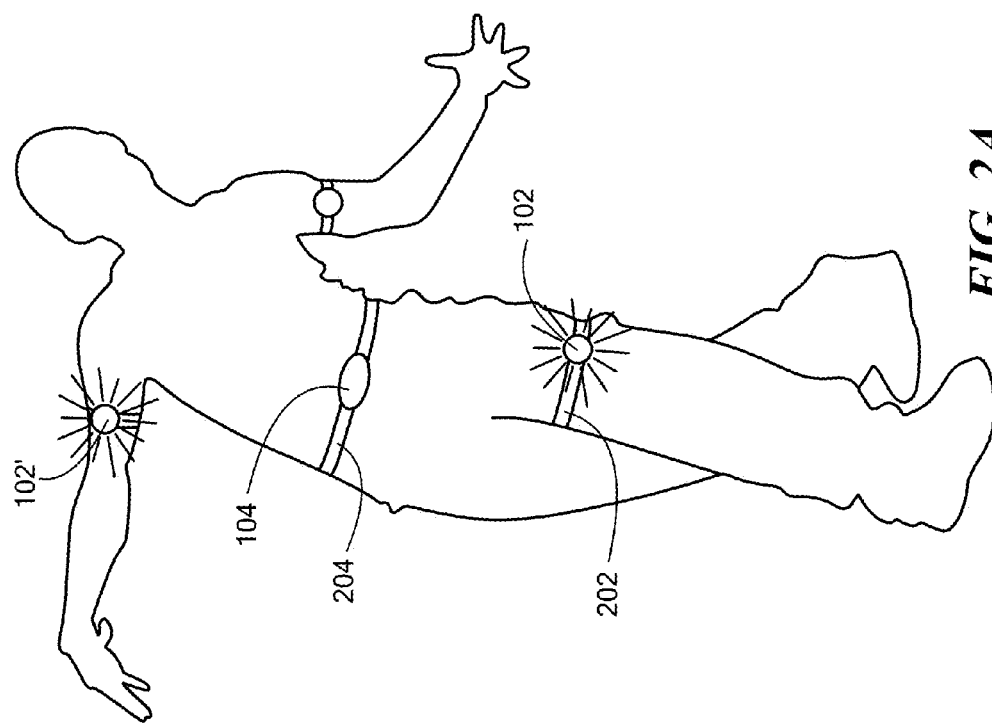

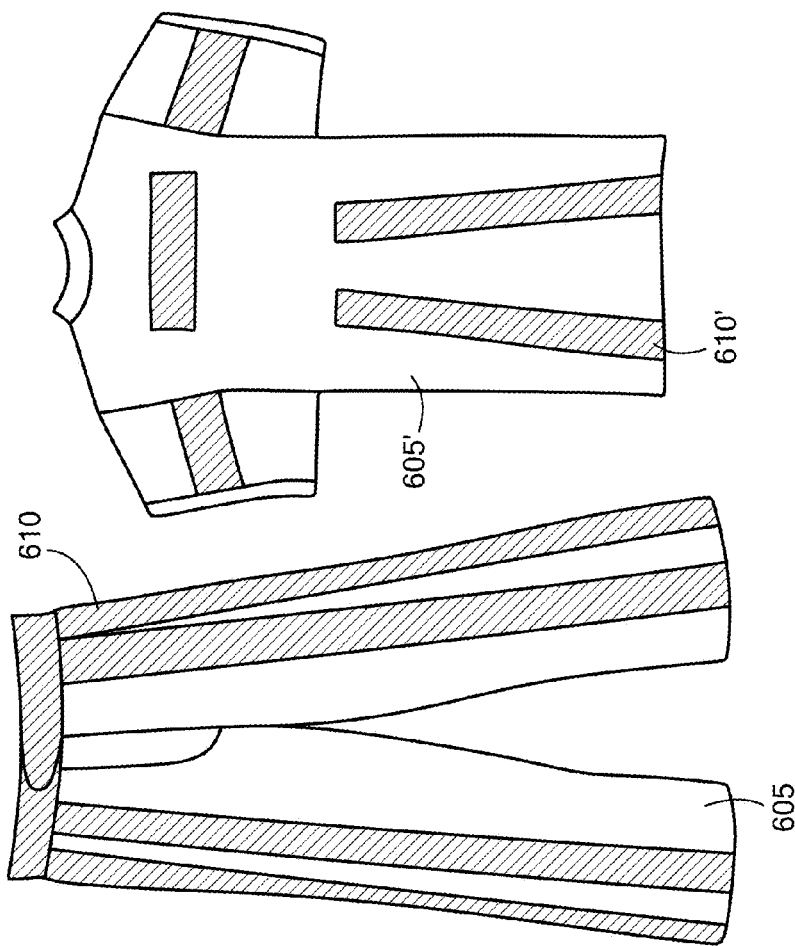
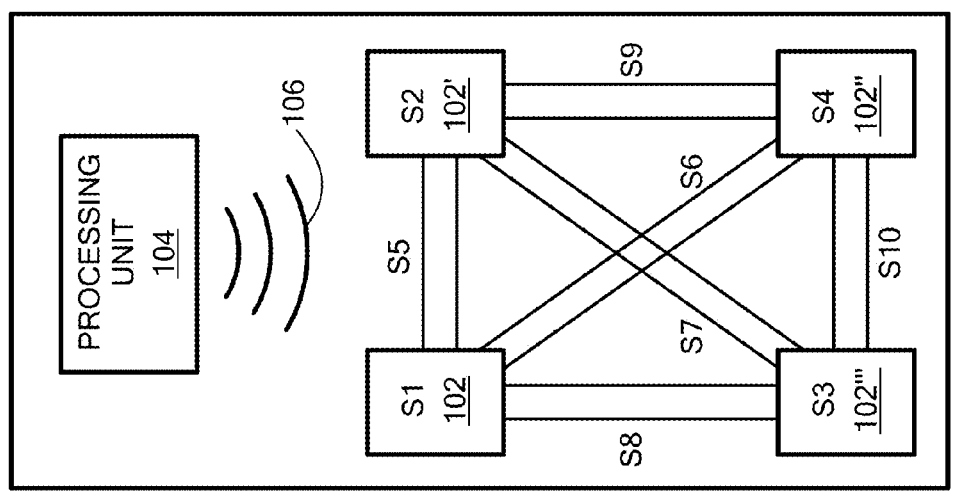
FIG. 6
FIG. 5

METHOD AND SYSTEM FOR IMPROVING BODILY DEXTERITY

FIELD OF THE INVENTION

The present invention relates to a portable system and method for improving bodily dexterity such as coordination between hand movement and eye. The system is useable as a gaming system.

DESCRIPTION OF RELATED ART

Innumerable competitive games and sports have been developed over the years. These games provide an outlet for the competitive nature of the players, as well as naturally assist in the development of bodily dexterity and body parts/eye coordination. For example, games involving using a ball or the like (e.g., baseball, football etc.) have been shown to be valuable in teaching such skills. However, such games include elaborate equipment, and require the use of at least two players even in a simple game. While the existing method and apparatus may be used with two or more persons, often times there may be no one else available for play, or other persons may not wish or be able to play at that particular moment. Further, many of these games such as a typical game of catch are considered an outdoor activity which requires a fair amount of room, which may not always be available. Furthermore, availability of ample ambient light is also an essential requirement for some of these games.

The other set of games, i.e. electronic games, are fairly well known as well. These games include game consoles that are currently available from various vendors. The game consoles usually couple to a television and also to an audio system. Some of these game consoles support wireless communications with handheld game controllers and/or other game accessories. The requirement of a large and hard to carry display unit, such as a TV or a monitor, not only limits use of these games only to a few sites, mainly indoors but also requires time and efforts for proper installation and configuration in order to provide a realistic gaming experience. Besides, when two persons play the game at the same time, they both face the display units with the result that users lack interaction between them. Furthermore, with the continued advancement of technology and controllers, the gaming environment has become very complex, thus alienating a large number of game lovers who prefer simpler interactive games. In other instances, these console based games are relatively expensive to afford. Also, a number of such console based games do little on improving bodily dexterity with limited requirement of body movement.

Other handheld-portable gaming units are also available. These gaming units include processor and a user interface with a display contained within a single unit. With these units, various buttons receive user input while a display provides user output. Because of the limited battery life, especially because of supplying power to the display, available with these units, their functionality has been limited in some regard. Also, they suffer from the limitation of providing insignificant scope for improving bodily dexterity or lack of physical interaction with other participants.

Accordingly, a gaming system overcoming above-mentioned problems of existing game systems is highly desirable.

SUMMARY OF THE INVENTION

According to an embodiment of the invention, a system for improving bodily dexterity is disclosed. The system includes a plurality of wearable sensor units and a processing unit. The plurality of wearable sensor units, in each of its sensor unit includes a sensor adapted to sensing a user action, a generating module adapted to generating an action signal that includes information about the user action performed on at least one of the plurality of sensor units, and a sensor transmitter adapted to transmitting the action signal. The processing unit includes a processing unit receiver adapted to receiving the action signal, an interpretation module adapted to interpreting the action signal in accordance with a set of pre-assigned criteria, and an output signal generator adapted to generating an output signal based on the interpreted action signal.

According to another embodiment of the invention, a method for improving bodily dexterity is disclosed. The method includes mounting a plurality of sensor units on at least a body part of a user, communicatively interfacing the plurality of sensor units with a processing unit, performing a user action on at least one sensor unit of the plurality of sensor units, generating an action signal that includes information about the user action, transmitting the action signal to a processing unit, interpreting the action signal in accordance with a set of pre-assigned criteria, and generating an output signal based on the response signal.

According to yet another embodiment, a system for improving bodily dexterity is disclosed. The system includes a plurality of wearable sensor units and a processing unit. Each sensor unit in the plurality of sensor unit includes a sensor receiver adapted to receiving the activation signal that indicates at least one of the plurality of sensor units requiring the user action, a sensor adapted to sensing a user action, a generating module adapted to generating an action signal that includes information about the user action performed on at least one of the plurality of sensor units, a sensor transmitter adapted to transmitting the action signal. The processing unit includes a processing unit transmitter adapted to transmitting an activation signal, a processing unit receiver adapted to receiving the action signal, an interpretation module adapted to interpreting the action signal in accordance with a set of pre-assigned criteria, and an output signal generator adapted to generating an output signal based on the interpreted action signal.

According to yet another embodiment of the invention, a method for improving bodily dexterity is disclosed. The method includes mounting a plurality of sensor units on at least a body part of a user, communicatively interfacing the plurality of sensor units with a processing unit, transmitting an activation signal to the at least one sensor unit of the plurality of sensor units wherein the activation signal indicating the at least one sensor unit requiring the user action, receiving the activation signal at the at least one sensor unit requiring the user action, performing a user action on at least one sensor unit requiring the user action, generating an action signal that includes information about the user action, transmitting the action signal to a processing unit, interpreting the action signal in accordance with a set of pre-assigned criteria, and generating an output signal based on the response signal.

According to yet another embodiment of the invention, a combined system for improving bodily dexterity is disclosed. The system includes a first system and a second system, wherein the first system and the second system individually includes features of any of the systems described in earlier embodiments of the invention. The first system and the second system are communicatively connected to each other.

According to yet another embodiment of the invention, a method utilizing a combined system for improving bodily dexterity is disclosed. The method includes mounting a first plurality of sensor units of a first system on at least a body part of a first user, mounting a second plurality of sensor units of a second system on at least a body part of a second user, communicatively interfacing the first plurality of sensor units with a first processing unit, communicatively interfacing the second plurality of sensor units with a second processing unit, and communicatively connecting a first processing unit of the first system with a second processing unit of the second system.

According to yet another embodiment of the invention, a system for generating a collective output signal is disclosed. The system includes a plurality of sensor units, each sensor unit comprising a sensor wherein more than one sensor of the plurality of sensor units are adapted to sense a user action performed, simultaneously/substantially simultaneously or within a specified time period or as an overlapping action, on the more than one sensor requiring user action.

According to yet another embodiment of the invention, a method for generating a collective output signal is disclosed. The method includes performing, simultaneously/substantially simultaneously or within a specified time period or as an overlapping action, a user action on more than one sensor of a plurality of sensor units and generating a collective output signal based on a collective interpretation of the more than one user action performed simultaneously/substantially simultaneously or within a specified time period or as the overlapping action.

According to yet another embodiment of the invention, a pluggable means is disclosed. The pluggable means includes a connectable end adapted to couple with an electronic device, the pluggable means comprising executable instructions in order to provide a set of functionality of the processing unit to the electronic device such as a portable smartphone.

According to yet another embodiment of the invention, a clothing accessory is disclosed. The clothing accessory includes a means for attaching at least one sensor unit of a plurality of sensor units and/or the processing unit.

According to yet another embodiment of the invention, a system for improving bodily dexterity is disclosed. The system includes a plurality of wearable sensor units and a processing unit. The sensor unit, individually, includes a sensor adapted to sensing a user action, a generating module adapted to generating an action signal that includes information about the user action performed on at least one of the plurality of sensor units, a sensor transmitter adapted to transmitting the action signal. The processing unit includes an activation signal generator for generating an activation signal, the activation signal indicating at least one sensor of the plurality of sensor units requiring the user action; a processing unit receiver adapted to receiving the action signal, an interpretation module adapted to interpreting the action signal in accordance with a set of pre-assigned criteria, an output signal generator adapted to generating an output signal based on the interpreted action signal.

BRIEF DESCRIPTION OF THE ACCOMPANYING FIGURES

The embodiments of the invention, together with its advantages, may be best understood from the following detailed description taken in conjunction with the accompanying figures in which FIG. 1 illustrates a system for improving bodily dexterity according to an embodiment of the invention;

FIG. 2A-2C illustrate wearability of the system in accordance with various embodiments of the invention;

FIG. 5 illustrates collective signal generation according to an embodiment of the invention;

FIG. 6 illustrates a clothing accessory according to an embodiment of the invention;

DETAILED DESCRIPTION OF THE INVENTION

The description and accompanying figures represent different components; where same components in different figures share same numeral. The invention relates to a portable system and for improving bodily dexterity such as coordination between hand movement and eye. The bodily dexterity in general is defined as movement of a body part either in response to user perception and/or as a part of user initiated process. The system is useable as a gaming system, a music system in various scenarios like in stage shows, and also as an exercise system and even in physical therapies. Other applications of the claimed system are conceivable by a skilled person. For example, the system use may include using the system as a gaming controller, as a controller in home automation, as an accessory in applications such as in mobile applications, etc.

Figure 1:
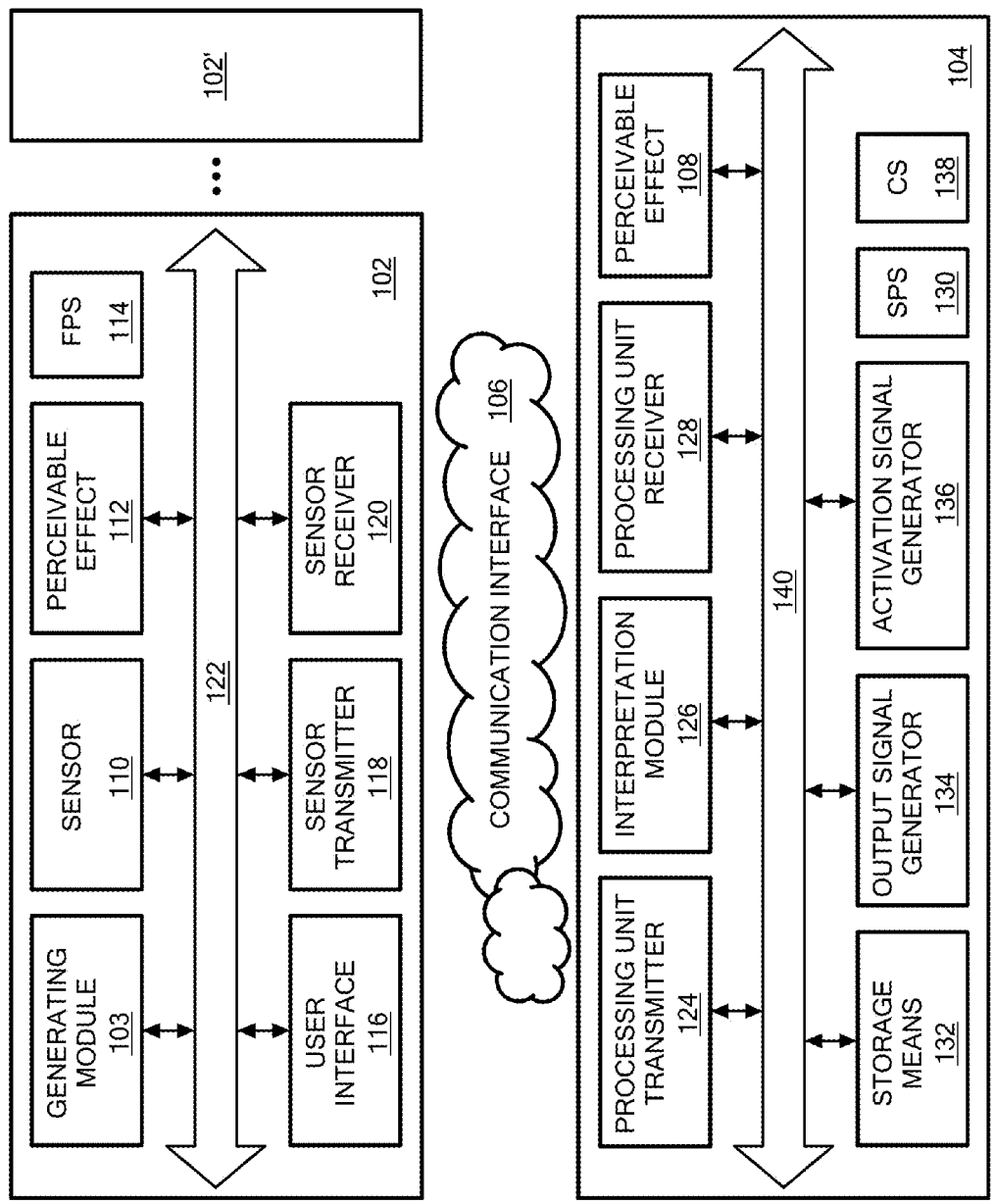

According to an embodiment of the invention, as shown in FIG. 1, a system 100 for improving bodily dexterity is disclosed. The system 100 includes a plurality of wearable sensor units (102 . . . 102') where each of the sensor unit includes a sensor 110 adapted to sensing a user action, a generating module 102 adapted to generating an action signal that includes information about the user action performed on at least one of the plurality of sensor units 102, a sensor transmitter 118 adapted to transmitting the action signal. The system also includes a processing unit 104 comprising a processing unit receiver 104 adapted to receiving the action signal, an interpretation module 126 adapted to interpreting the action signal in accordance with a set of pre-assigned criteria, an output signal generator 134 adapted to generating an output signal based on the interpreted action signal. The individual components of the processing unit are connected with one another through a data bus 140. Similarly, individual components of the sensor unit are connected with one another through a data bus 122.

Figure 2C:
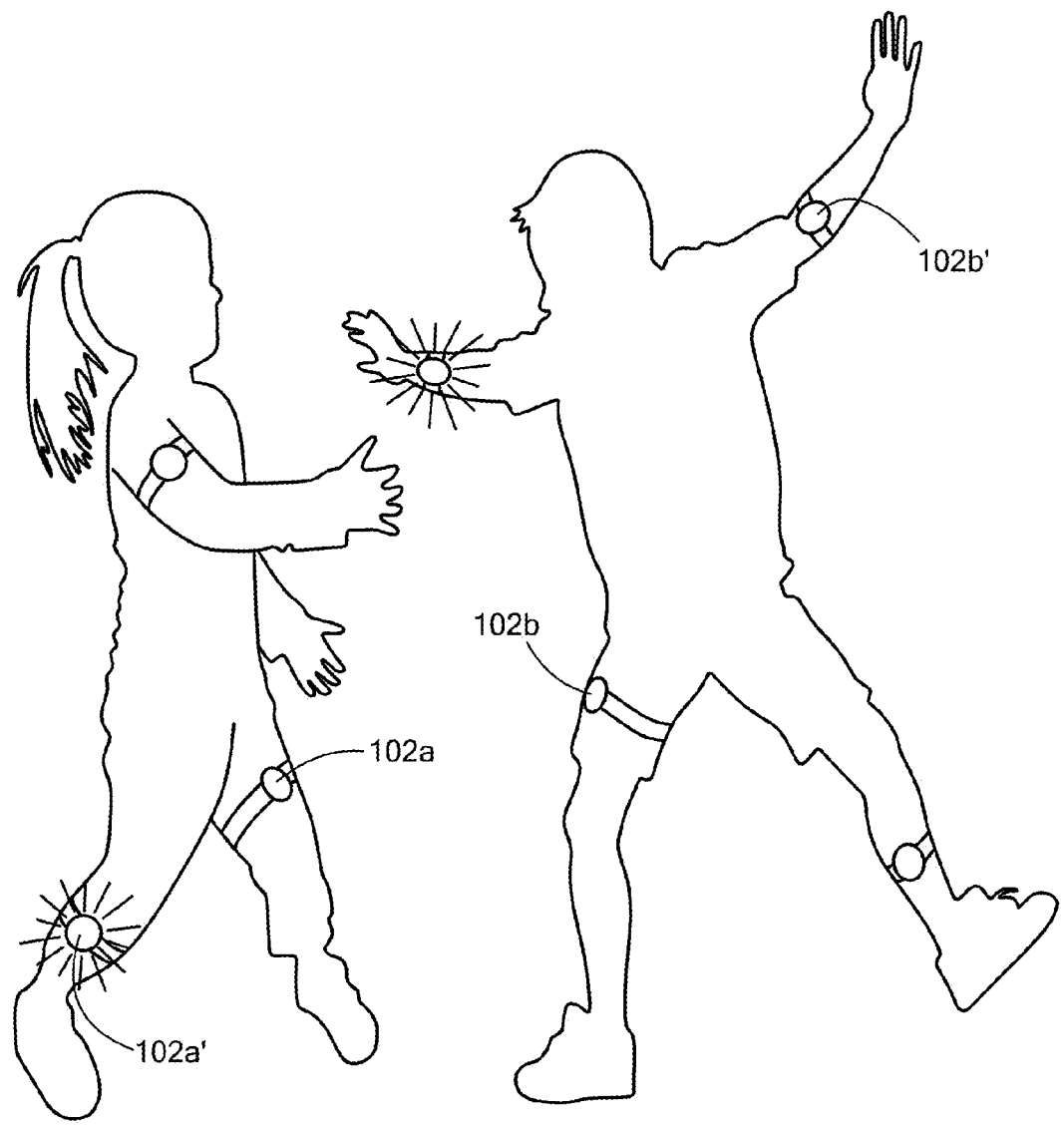

Both the processing unit and the plurality of sensor units are portable, to an extent that one user may easily move the system 100 in a small bag or while holding the system in his hands or even while mounted on his body. In one embodiment, the processing unit 104 is also wearable. The wearability of the plurality of sensor units and/or processing unit is illustrated in FIGS. 2A-2C. The wearabilty is achieved by including mounting means (202 and 204) individually for the plurality of sensor units and/or the processing unit. The mounting means allows for mounting the plurality of sensor units and/or the processing unit on a body part, preferably in a front facing orientation, of a user. The mounting in a front facing orientation (refer FIG. 2A) is described as mounting at least one or more of the plurality of sensor units and/or processing unit with the sensor and/or processing unit facing in the same direction as the front body. However, in other embodiments, both the plurality of sensor units and the processing unit are mounted in sideway facing (refer sensor unit 102 in FIG. 2B) or back facing orientation (not shown), where the sensor and/or processing unit face in the same direction as the side body or back body respectively. Similarly, the plurality of sensor units may be placed in upward facing orientation, refer sensor unit 102' in FIG. 2B). It is recognizable that a combination of front facing orientation, back facing orientation, side facing orientation and upward facing orientation for one or more sensor units of the plurality of sensor units is possible. Similarly, the processing unit may be oriented to face in one of four orientations, namely front facing, side facing, upward facing and back facing. Therefore, in various embodiments, mounting orientation of the plurality of sensor units and/or the processing unit is selected from a group consisting of a front facing orientation, side facing orientation, upward facing orientation, a back facing orientation, and a combination thereof.

Figure 3:
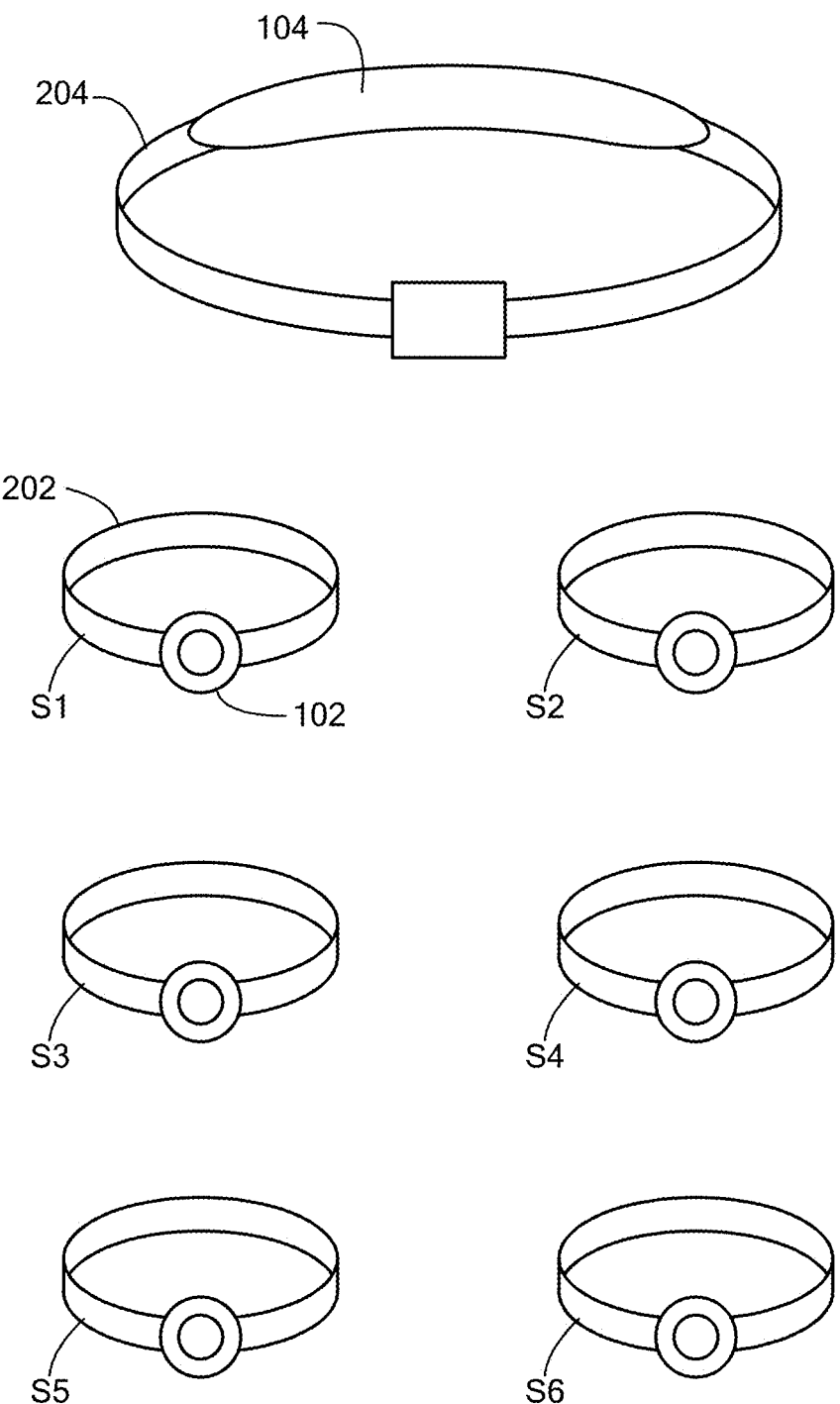
FIG. 3 illustrates a processing unit and the plurality of sensor units with respective mounting means according to an embodiment of the invention.
Figure 4:
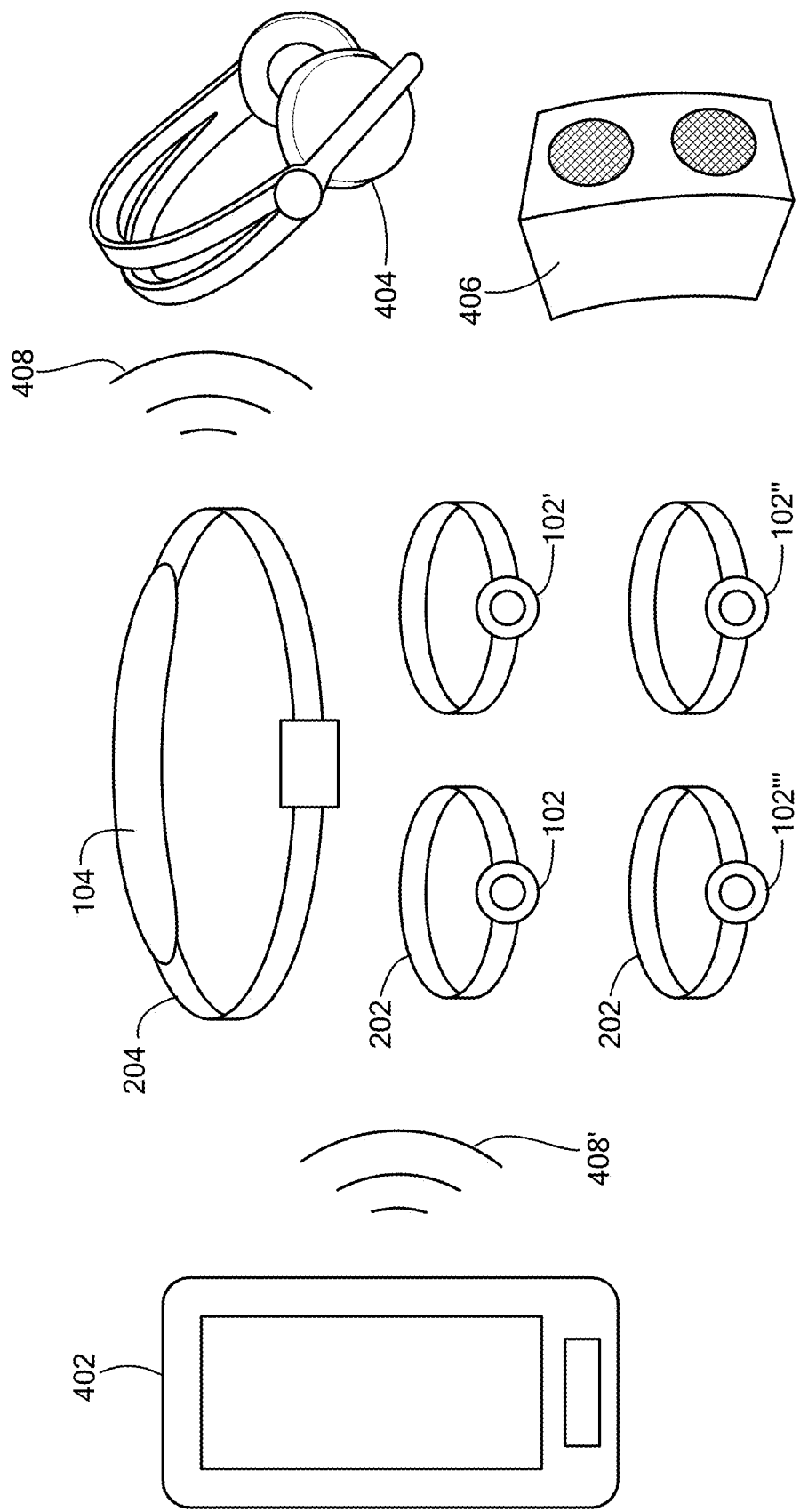
FIG. 4 illustrates a system where the output signal is transmitted to an external device according to an embodiment of the invention.

FIG. 3 illustrates the processing unit 104 and the plurality of sensor units 102 (S1 through S6) with respective mounting means according to an embodiment of the invention. In an embodiment, the mounting means (202 and 204) is an elastic band means. However, in other embodiments, the mounting means is a wraparound strapping means having a fastening means that may include a loop-and-hook assembly, zipper assembly, hook-and-eye closure assembly, laces, buckle-and-hole assembly, buckle assembly, button-and-hole assembly, snap fastener assembly, magnetic closure assembly and a combination thereof. The elastic band means may also include one the fastening means listed above. For example, the elastic band is useable as a wraparound strapping means where the fastening means is a loop-and-hook assembly.

In various embodiments, the sensor in each of the plurality of sensor unit is selected from a number of sensor types—pressure sensor, tactile sensor, level sensor, proximity sensor, touch sensor, motion sensor, piezo electric sensor, mechanical button, digital button, vibration sensor, accelerometer, micro-gyros, 3-D compass, audio sensor and a combination thereof. Therefore, the one sensor unit in the plurality of sensor unit may include a sensor that is different from those included in other sensor units. For ease of representation purposes, the description typically illustrates a touch sensor that emits lights, usually different colored, as perceivable effects (FIG. 1, 108) in response to an activation signal (discussed later) and in response to the output signal respectively. Similarly, depending upon the sensor being used, the user may be required to take specific action, defining a user action. The user action is defined in terms of bodily movement and may include one or a combination of touching the sensor, applying pressure to the sensor, and moving the body part to which sensor unit is mounted. For example, if the sensor is touch sensor, then the user will have to touch the sensor in order to generate action signal. In an event of the audio sensor like a microphone, the user action may include any user actions such as tapping the audio sensor to create a sound detection at the audio sensor because of the tap or clapping near the audio sensor or snapping fingers near the audio sensor, etc. However, if it is a combined sensor, such as a touch+vibration sensor, in a sensor unit the user will have to touch the sensor and also move (vibrate) the body part vigorously to which the vibration sensor is attached/mounted. In various embodiments, it may be defined whether the touch and the vibration of the body part to which the sensor is mounted needs to be together or one following another or the sequence in which touch and vibration should occur. The sensor thus senses/detects the user action performed on the sensor. It is apparent that the sensor type and type of user action that the sensor senses are inter-related. Furthermore, it may also be defined how much pressure (or pressure range) is required say, for example, a pressure sensor to sense the user action of applying pressure to the sensor. Similarly, for sensors like vibration sensors, either exact movement or a small acceptable deviation from the exact movement of user body part to which the sensor is mounted may be defined and the sensor may be adapted to sense the movement within the deviation as the user action.

In order to generate the action signal, the generating module 102 interacts with the sensor 110 and receives the detection made by the sensor of the user action. The action signal includes information about the user action performed on the sensor. This information includes whether the sensor sensed the user action or not. For example, the sensor will not sense the user action if the user fails to take any action for the sensor type used in the system, or in case of combined sensor, not all required user actions, such as both touch and vibration actions of touch+vibration sensor, are performed. Similarly, in case of pressure sensor, no user action will be sensed if pressure sensor senses a pressure that is lesser than what the pressure sensor is configured to sense. In essence, the generating module 102 generates a signal having information that reflects whether the sensor sensed a user action or not. If no user action is taken on the sensor, then generating module does not send any action signal. The sensor transmitter 118, which is in communication with the generating module, transmits the action signal.

The processing unit 104 includes a processing unit receiver 128 that is adapted to receive the action signal. The processing unit further includes an interpretation module 126 that is adapted to interpreting the action signal in accordance with the set of pre-assigned criteria that is stored in a storage means 132. In one embodiment, the pre-assigned criteria define what action signals, for a particular type of sensor, complies with the requirements for invoking which function. In other words, the pre-assigned criteria define a look-up table that maps an action signal with the function. If the requirement(s) for invoking is not met, the function is not invoked. The function may include producing any of the perceivable effect like visual, audio, vibrational, smoke, smell etc. For example, switching on a colored light, playing a music file, producing vibration of other sensor units that are not acted upon, triggering machines for creating a theatrical smoke and fog, triggering a sprayer for spraying a distinct aroma, and even a combination of these effects such as producing visual and audio effect on a display screen either in console based games or in stage performance. The interpretation module includes codes for executing a mapping technique in order to associate/map the action signal with the function. The interpretation module executes the codes in order to analyze the information contained in the action signal, searches for the information in a mapping table, and identify function relating to the information. If the search in the pre-assigned criteria produces no result, then either no function is invoked or a default function associated with such "no search result" scenario is invoked. The steps of analyzing, searching and identifying define the interpretation of the action signal. An example of such mapping table is included below in Table A:

TABLE A

| S. No. | Type of Sensor/ User Action | Pre-assigned Criteria to be searched | Associated Output Signal |
|---|---|---|---|
| 1. | Touch Sensor 1/Touch | Sensor was touched | Play audio file A on processing unit perceivable effect generator (FIG. 1, 140) |
| 2. | Vibration Sensor 2/Vigorous body Movement | Body part (hand) with sensor attached was vibrated/shook | Send signal to a smoke generator to producing smoke effect S |
| 3. | Vibration Sensor 3/Vigorous body movement | Body part (like hand) with sensor attached was moved vigorously | Send signal to a display unit to play video file V |
| 4. | Pressure Sensor 4/Application of pressure | Pressure applied at least P pressure value | Send signal to the plurality of sensor to turn on green light on perceivable effect generator (refer FIG. 1, 108) |
| 5. | Touch sensor 1 + Vibration sensor 2/More than one user action on more than one sensors | Simultaneous action of touch and vibration on the sensors | Send signal to increase the pace by 2X of the audio file which is being played on an external speaker |
| 6. | Touch sensor 2/Touch | Sensor was touched | Send signal to a spray system to spray an aromatic rose fluid in order to produce rose flower smell |
| 7. | Vibration Sensor 5/Vigorous body movement | Right hand with sensor attached was moved vigorously | Send signal to a console based car game to turn the car in the right direction |

The person skilled in the art would appreciate that many combinations of sensor types and output signal are possible. For example, in a system including a touch sensor, a particular sensor of the plurality of sensors senses a one touch (user action) of the user; the generating module generates an action signal including information that the user touched the sensor once and the sensor transmitter transmits the action signal, which is received by the processing unit receiver. The interpretation module executes the codes in order to analyze the information contained in the action signal, i.e. one touch on the sensor, searches for the information in a mapping table, and identifying function relating to the information. If the pre-assigned criteria include requirement that the detection of one touch on the particular sensor plays a music file X, then the interpretation module will eventually invoke, using output signal generator, the function playing the music file X. In other embodiments, the function may include playing a music file, stopping a music file, fast forwarding, skipping to next track, etc. The function may also include speeding the pace of the music, triggering a smoke device that are commonly used in stage performances, producing vibrational sensation on the particular sensor or more than one sensor of the plurality of sensor, even video output on a display unit like a large display units in stage performances, etc. Similarly, in other embodiments, the sensors may be used, through interpretation module (126) and mapping table, a) as a controller in interactive home automation systems or b) as an interactive game controllers like in console based games/mobile based games (for example, see entry 7 in Table A). The mapping table specific to a particular game may be downloadable, typically over the internet, as an executable application (app) such as a mobile app. In other embodiments, the downloadable app may provide non-game related interactive features, such as opening a program, with the game console/computer/mobile or other electronic device. The user action provides the necessary input for the system to act as a controller.

The processing unit 104 also includes an output signal generator 134 that is adapted to generating an output signal based on the interpreted action signal, where the interpretation is performed by the interpretation module 126 using the pre-assigned criteria. The output signal includes an instruction for producing a perceivable effect. The perceivable effect, using the output signal, may be produced at least one of the perceivable effect generator 108, perceivable effect generator 140 and an external device (refer FIGS. 4, 402, 404 and 406). The output signal generator 134, using the processing unit transmitter, sends the output signal to a device (refer FIGS. 4, 402, 404 and 406) using a processing unit transmitter 124 or to one or all sensors for producing the perceivable effect. The effect includes a number of visual effects such as video output and/or light output, a number of smoke effects like a stage performance or concerts, a number of audio effects, a number of vibrational effects, variation in the perceivable effects and a combination thereof. The variation may include changing frequency and amplitude of the perceivable effect, for example the audio effect may be played faster/slower, the visual effect may have a flashing light, the vibration may be a single vibration or a continuously short ones, etc. Once the interpretation module identifies the function to be invoked, the output signal generator generates an appropriate output signal that triggers the function, which is linked to the interpreted action signal in the pre-assigned criteria look up table.

In an embodiment, the plurality of sensor units (102 . . . 102') is individually adapted to produce the perceivable effect in accordance with the output signal. Therefore, which function is to be invoked for the same user action may be customized for each sensor unit of the plurality of sensor units. For example, one touch on the sensor 1 of sensor unit 1 may produce an audio effect whereas one touch on the sensor 2 of the sensor unit 2 may produce a smoke effect. In another embodiment, the same sensor may be configured such that one user action on the sensor produces one effect, whereas more than one user action, within a specific time produces, on the same sensor produces a different effect. For example, touching the sensor 1 of the sensor unit lights up a blue light on the sensor 1 and playing audio file 1, but touching the sensor 1 twice within 0.5 seconds lights up a green light and plays an audio file 2. There are many combinations of perceivable effects that can be produced using the principles of the present invention.

As mentioned earlier, the system 100 may be in communication connection (refer FIG. 4, 408, 408') with a device (refer FIG. 4, 402, 404, 406) such as a smoking device, or display device, or speaker system, lighting device or a device that is capable of producing a perceivable effect. In particular, the device is communicatively connected to the processing unit and the device is capable of producing the perceivable effect. In such scenario, the requirements will include entries that relate particular information of the action signal with the invoking of the device, and the output signal will invoke the device to produce the perceivable effect.

In an embodiment, until a condition is met, the generating module 112 is adapted to producing a series of action signals that includes information about a series of user actions performed on the at least one of the plurality of sensor units (102 . . . 102'), the interpretation module 126 is adapted to interpreting the series of action signals in accordance with the set of pre-assigned criteria; and the output signal generator 134 is adapted to generating a series of output signals based on a series of interpreted action signals.

The series of user actions is defined by a first user action followed by a subsequent user action. The sensor senses the first user action, the generating module 112 generates a first action signal, the sensor transmitter 118 transmits the first action signal, the processing unit receiver 124 receives the first user action, the interpretation module 126 interprets the first action signal, the output signal generator 134 generates the first output signal based on the interpreted signal in order to produce a first perceivable effect. The user, if acts again on the sensor or one of the other sensors, produces a second user action until the generation of a second output signal that produces a second perceivable effect. The following steps involving third, fourth and so on user actions until the generation of third, fourth and so on output signal defines the series.

Depending upon the scenario like a game, exercise routine, performance, etc., different conditions may be implemented. The condition may include the user voluntarily decides to stop taking the user actions. If the system is employed as a gaming or exercise system, then the condition may include stopping if the conditions for progressing further with the game is unmet and the user may be asked if he wishes to repeat the gaming task or exercise-task. Similarly, the condition may include stopping if the user finished performing the actions that the game or exercise routine requires for a specific level and the system may then automatically or at user choice move to another level where usually more difficult conditions such as faster user action response compared to earlier level are included. In other scenarios, if the system is synchronized with output as an audio file, then the condition may include stopping if the audio file has finished playing. Other conditions may include stopping based on time limitation, and/or specific number times the user action was required to be performed. Similarly, if the system is used a console game controller, then the condition may include when the game played is over, or the stage is over or the user fails to meet the challenges posed in the game, etc. As mentioned earlier, there are a large number of conditions that may be used, for various scenarios, in order to use the system in different scenarios like gaming/controller, musical/stage performance and also in physical therapy sessions. This may even include combinations of different conditions in order to define when the system needs to stop, for example stopping the system when the song gets over or the number of user actions reaches a particular number, whichever is earlier.

The user action may be performed on more than one sensor of the plurality of sensor units. In one embodiment, individual sensors of the more than one sensor are adapted to sense the user action performed simultaneously or substantially simultaneously. The word "substantially simultaneously" refers to scenarios where the action performed on the more than one sensor is almost at the same time, i.e. with an insignificant time delay between user actions on the more than one sensors. Similarly, in another embodiment, the more than one sensor is adapted to sense the user action performed, within a specified time period, on the more than one sensor. The specified time period is usually short, such as half a second, preferably quarter of a second or more preferably one-eighth of a second or as low as $1/64^{th}$ of a second or lesser. In yet another scenario, the user action is an overlapping action—performed on a first sensor in combination with the user action on a second sensor, i.e. performing the user action on the first sensor with the user action still being performed on the second sensor, resulting in an overlapping signal. As a parallel example, this scenario is similar to using the "shift" key on a keyboard in combination with other keys while continuing to press the "shift" key.

In any of the scenarios mentioned in the preceding paragraph where more than one sensor sense the user action, each generating module 112 associated individually with the more than one sensor of the plurality of sensor units (102 . . . 102') separately produces an action signal, thereby collectively producing more than one action signal and each sensor transmitter associated individually with the more than one sensor of the plurality of sensor units transmits the action signal generated by the respective generating module 112. The processing unit receiver receives the more than one action signal simultaneously/substantially simultaneously or within the specified time period or as the overlapping signal, the interpretation module 126 collectively interprets the more than one action signal in accordance with the set of pre-assigned criteria and the output signal generator 134 generates a collective output signal based on the collective interpretation of the more than one action signal. An example of collective interpretation is given in the entry no. 5 of Table A.

In any of these embodiments, the pre-assigned criteria includes, in its mapping table, collective action signal mapping to a function. For collective action signal, the mapping table defines requirements where more than two action signals need to satisfy a certain requirement, such as being received at the processing unit simultaneously/substantially simultaneously/within a specified time period/as an overlapping signal, in order to have a function associated with the user action on more than one sensors. If the certain requirement is not met, then the action signals are treated as if they are received as individual action signals that do not produce the collective output signal. Instead, the output signal, if the certain requirement is unmet, would be same as if the sensors are sensing the user action on each sensor separately. For example, in the Table A, if the requirement of simultaneous action of touch and vibration on the sensors is met, then collective output signal would increase the pace by 2× of the audio file as a perceivable effect. However, if such requirement is not met, then individual output signal from Sensor 1 and Sensor 2 would produce separate perceivable effect of playing audio file A and smoke effect S.

In some embodiments, the collective output signal may still be mapped to produce an output signal that produces the same perceivable effect as the one produced when action signal from one of the sensors of the more than one sensor is received, however the collective output signal is typically different from the one produced by action signal received from any of the sensors of the more than one sensor individually. In other words, the generated collective output signal is different from the output signal generated for individual sensors of the more than one sensors if the individual sensors sense the user action outside the requirement of the user action being performed simultaneously/substantially simultaneously/within a specified time period/as an overlapping action. For example, in case of two sensor units, if sensor 1 senses a user action, the output 1 is a red light and if sensor 2 senses a user action, the output is a yellow light. However, if the sensor 1 and sensor 2 simultaneously sense user action on each of the sensors, then the collective output is a green light. Using this implementation, the sensor sensing more than one user action, in accordance with any of the included embodiments, increases the number and type of perceivable effects that can be produced using the same number of sensor units. For example, in absence of collective output signal, a four sensor unit set up with only one touch sensation would typically produce 4, output signals, i.e. one for each sensor unit. However, configuring the sensor units for simultaneous/substantially simultaneous user action of one touch on two of the same 4 sensor unit set up would result in 10 output signals, i.e. one for each 4 sensors and other six for a combination of two sensor pairs. This is represented in FIG. 5, which illustrates collective signal generation according to an embodiment of the invention. A system includes four sensors (102 though 102") of the plurality of sensor. If each sensor unit only sense user action performed on each of them separately, then only four output signals are generated, namely S1 through S4. However, in scenarios where more than one sensor (in this scenario two sensors) sense the user action in ways described above, then 10 output signals will be generated, i.e. S1 through S10. Like, S5 is generated with user action is performed on 102 and 102' simultaneously, S6 when the user actions are simultaneously performed on 102' and 102"". Increasing the number of sensors with this principle and additional sensing at three or more sensors simultaneously/substantially simultaneously/within specified time period/as overlapping action will add additional output to separate sensing/detection at one sensor only. The interpretation module 126, in these embodiments, analyses the individual signal of the more than one action signal to determine whether the individual sensor of the more than one sensor sensed the user action, whether the more than one action signals received at the processing unit receiver satisfy the certain requirement of simultaneously/substantially simultaneously/within the specified time period/as an overlapping signal. If so, then identifying the function, from the mapping table, that is to be invoked.

In another embodiment, the processing unit 104 includes a processing unit transmitter 124 that is adapted to send an activation signal, and the sensor unit 102 that includes a sensor receiver 120, in each of the plurality of sensor units (102 . . . 102'), adapted to receiving the activation signal that indicates at least one sensor unit (refer FIG. 2, 102/102') of the plurality of sensor units requiring the user action. The activation signal includes instructions for producing a perceivable effect (refer FIG. 2, 102/102'—the perceivable effect is shown as a light) on at least one of the plurality of the sensor units, the produced perceivable effect indicating the sensor unit requiring the user action. In an embodiment, where the output signal/collective output signal produces the perceivable effect at the sensor of the plurality of sensor units; the perceivable effect produced by the activation signal may be same as the perceivable effect produced by the output signal or the collective output signal. However, in preferred embodiment, the perceivable effect produced by the activation signal on at least one of the sensor units is different than the perceivable effect produced by the output signal or the collective output signal. For example, if the activation signal produces a perceivable effect of red light at the sensor, then the sensor turned red is indicated as the one requiring a user action. If the sensor is a touch sensor, then touching the sensor is the required user action. If the sensor is touched and the sensor (sensor associated with 102' in FIG. 2 if the user touches sensor unit 102) senses the user action, the generating module 112, sensor transmitter 118, processing unit receiver 128, interpretation module 126, and output signal generator 134 operate in a way described earlier in the description, in order to produce the output signal. The output signal now produces a perceivable effect of say green light at the sensor 102' that was initially indicated with red light. In fact, all or some of the sensors may produce perceivable effect when instructed to do so by the output signal. In other examples, the activation signal may produce a vibrational effect at least at one of the sensor units whereas the output signal may produce a light signal. Likewise, it could be a combination of two or more perceivable effects, like vibration plus light as a result of activation signal and sound as a result of the output signal. The possibilities of combining such perceivable effects are many and such effects are typically selected from a number of visual effects, a number of audio effects, a number of smoke effects, a number of vibrational effects, variation in the perceivable effects or a combination thereof. The variation may include changing frequency and amplitude of the perceivable effect, for example the audio effect may be played faster/slower, the visual effect may have a flashing light, the vibration may be a single vibration or a continuously short ones, etc.

When the user takes an action on the at least one sensor that indicates requirement of the user action, then the generating module generates the action signal that includes information about the user action performed on the at least one sensor unit of the plurality of sensors requiring the user action. Once the user takes the required action on the activated sensor unit, the activated sensor unit no longer produces the perceivable effect. The required action is defined by the characteristics of the user action (described later).

In an embodiment, until a condition is met, the processing unit transmitter 124 is adapted to transmit a series of activation signals, the sensor receiver of at least one of the sensor unit (102 . . . 102') receiving the series of activation signal that indicates at least one of the plurality of sensor units requiring the user action, the generating module of the at least one sensor unit requiring the user action is adapted to producing a series of action signals that includes information about a series of user actions on the sensor requiring the user action, the interpretation module 126 is adapted to interpreting the series of action signals in accordance with the set of pre-assigned criteria, and the output signal generator 134 is adapted to generating a series of output signals based on a series of interpreted action signals.

The series of activation signal is defined by a first activation signal followed by a subsequent activation signal. The subsequent activation signal is transmitted after the action signal, relating to the first activation signal, is received at the processing unit receiver 128. The series of user actions is defined by a first user action-followed by a subsequent user action. Once the user takes the required action on the activated sensor unit, the activated sensor unit no longer produces the perceivable effect until the same sensor unit receives another activation signal from the series of activation signals. The required action is defined by the characteristics of the user action (described later).

The sensor that receives the first activation signal at at least one of the sensor units where the activation signal indicates the at least sensors requiring the user action, the sensor senses the first user action on the at least one sensor units requiring the user action, the generating module generates a first action signal, the sensor transmitter transmits the first action signal, the processing unit receiver 128 receives the first user action, the interpretation module 126 interprets the first action signal, the output generator 134 generates the first output signal based on the interpreted signal in order to produce a first perceivable effect. After receiving the first action signal, the processing unit transmitter 124 sends a second activation signal indicating same or another at least one sensor units requiring the user action. The user, if acts again on the at least one sensor now requiring the user action, produces a second user action until the generation of a second output signal that produces a second perceivable effect. The following steps involving third, fourth and so on activation signals, user actions until the generation of third, fourth and so on output signal defines the series until the condition is met.

Depending upon the scenario like a game, controller, exercise routine, performance, etc., different conditions may be implemented. The condition may include the user voluntarily decides to stop taking the user actions. If the system is employed as a gaming or exercise system, then the condition may include stopping if the conditions for progressing further with the game is unmet and the user may be asked if he wishes to repeat the gaming task or exercise task. Similarly, the condition may include stopping if the user finished performing the actions that the game or exercise routine requires for a specific level and the system may then automatically or at user choice move to another level where usually more difficult conditions such as faster user action response compared to earlier level are included. In other scenarios, if the system is synchronized with output as an audio file, then the condition may include stopping if the audio file has finished playing. Other conditions may include stopping based on time limitation, and/or specific number times the user action was required to be performed. As mentioned earlier, there are a large number of conditions that may be used, for various scenarios, in order to use the system in different scenarios like gaming, musical/stage performance and also in physical therapy sessions. This may even include combinations of different conditions in order to define when the system needs to stop, for example stopping the system when the song gets over or the number of user actions reaches a particular number, whichever is earlier.

In one embodiment, the processing unit transmitter 124 transmits the activation signal to more than one sensor unit of the plurality of sensor units, thereby indicating more than one sensor requiring the user action. In response, the user action may be performed on more than one sensor of the plurality of sensor units. In-one embodiment, individual sensors of the more than one sensor, requiring user action, are adapted to sense the user action performed simultaneously or substantially simultaneously (for example, if in FIG. 2A, the user touches sensor unit 102 with right hand and sensor unit 102' with left hand simultaneously/substantially simultaneously). Similarly, in another embodiment, the more than one sensor, requiring user action, is adapted to sense the user action performed, within a specified time period, on the more than one sensor. The specified time period is usually short, such as half a second, preferably quarter of a second or lesser. In yet another scenario, the user action is an overlapping action performed on a first sensor, requiring user action, in combination with the user action on a second sensor that is also indicated to be requiring the user action, i.e. performing the user action on the first sensor with the user action still being performed on the second sensor, resulting in an overlapping signal. As a parallel example, this scenario is similar to using the "shift" key on a keyboard in combination with other keys while continuing to press the "shift" key.

In the embodiments where more than one sensor units receive the activation signal, each generating module 112 associated individually with the more than one sensor unit 102, requiring the user action, of the plurality of sensor units (102 . . . 102') separately produces an action signal, thereby collectively producing more than one action signal. Furthermore, each sensor transmitter 118 associated individually with the more than one sensor, requiring the user action, of the plurality of sensor units transmits the action signal generated by the respective generating module. At the processing unit 104, more than one action signal (collectively from all generating modules) received at the processing unit are processed by the interpretation module in the same way as described earlier in the description.

In various embodiments, the characteristics of the user action are defined in terms of type of sensor used, duration for which the user action is performed or the pressure that is applied during the performance of the user action on the sensor. The user action and its characteristics is generally defined in terms of bodily movement and may include one or a combination of touching the sensor, applying pressure to the sensor, and moving the body part to which sensor unit is mounted.

In different implementation of the system, the sensor transmitter 118-sensor receiver 120 of each sensor unit 102 and the processing unit transmitter 124-processing unit receiver 128 include a communication interface (FIG. 1, 106) for providing communication link between each of the plurality of sensor units (102 . . . 102') and the processing unit 104. The communication interface may include a wired link or a wireless link, such as radio communication link selected from a group consisting of Radio Frequency Identification (RFID), wi-fi, bluetooth, and near-field communication (NFC). Other possible communication interfaces are also possible.

Each of the sensor unit of the plurality of sensor unit (102 . . . 102') includes a first power source 114, such as a battery for providing power to the sensor unit 102. Similarly, the processing unit 104 also includes a second power source 130, such as a battery. The electrical connections of the power sources in the sensor unit and the processing unit are not shown in the FIG. 1 in order to present a cleaner figure. The plurality of sensor units and/or the processing unit may also include rechargeable means (not shown) to recharge the first power source and the second power source respectively. Alternatively, the sensor unit and/or the processing unit may have a power connecting means (not shown) individually in order to directly draw power from a walled socket or to charge the power sources.

The processing unit 104 is adapted to processing the action signal, and generating the output signal. The interpretation module 126, in operational relationship, with the pre-assigned criteria processes the action signal and the output signal generator 134 generates the output signal.

In another embodiment, the processing unit 104 is also adapted to generating the activation signal. An activation signal generator 136, which may be the output signal generator 134 if the output signal generator is further configured to include the functionality of generating the activation signal as well, generates the activation signal in order to produce the perceivable effect at at least one of the sensor units. The sequence in which the perceivable effect is produced at one of the plurality of sensor units is included in an activation table. The activation table may also include situation where more than one sensor units are producing the perceivable effect at the same time, indicating the sensor units requiring the user action. In general, the activation table varies from scenario to scenario. For example, for game 1, the sequence is different from that in a game 2. Therefore, the activation table will include, in various embodiments, a) which sensor needs to be acted upon by the user and in what sequence such that the series of activation signals, when followed up the series of user action, result in generating an output signal resembling a song, or b) which sensor needs to be acted upon by the user and in what sequence such that the series of activation signals, when followed up the series of user action, result in generating an output signal that are part of a stage musical performance including smoke effect or visual effect or sound effect, or c) which sensor to be acted upon by the user and in what sequence such that the series of activation signals, when followed up the series of user action, result in generating an output signal that allow a physical therapist to monitor patient body movement and progress, or d) which sensor to be acted upon by the user and in what sequence such that the series of activation signals, when followed up the series of user action, result in generating an output signal that is part of a gaming experience. The person skilled in the art would appreciate that there are many such variations that are possible for defining the activation table and related sequence.

The processing unit 104 also includes a user interface 116 for selecting the activation signal. In other words, the user interface 116 allows the user to make a selection among different available sequences. Making a user selection allows the activation signal generator to accesses the activation table and the sequence selected, and generating a series of activation signals, thereby indicating at least one sensor unit that requires the user action. The selection may be classified under one list or preferably, under various categories like gaming, music, exercise, etc. Each of such categories may have further sub-categories. The user interface, providing accessibility to the user, may include physical buttons, graphical touch screen, and a combination thereof.

The processing unit also includes a storage means 132 for storing the information included in the action signal, and information to be associated with the output signal. The information included in the action signal typically indicates whether the sensor was acted upon or not. The information associated with the output signal includes which perceivable effect is to be produced for the output signal and instructions for invoking the function. In another embodiment, the storage means also stores the information included in the activation signal. This information includes the sequence, types of perceivable effect for each activation signal, number of activation signals in a series, the sensor unit(s) to be indicated with each activation signal. The storage means 132 also stores the pre-assigned criteria.

The processing unit 104, using components like activation signal generator 136, interpretation module 126, and output signal generator 134, is adapted to access information stored in the storage means. In one embodiment, the processing unit comprises a communication slot 138 such as an Universal Serial Bus (USB), Serial Advanced Technology Attachment (SATA), etc., for exchanging information with an external storage media. In another embodiment, the processing unit 104 is communicatively connected to a storage device, the processing unit 104 being adapted to download data from the storage device and to upload information to the storage device. The communication connection in this embodiment, and in other situations where communication is established, is either a wired connection or a wireless connection. The accessibility of external storage media or downloading/uploading option, allows for accessing sequences of activation signals that are not locally available in the storage means.

In one embodiment, the processing unit 104 is also adapted to creating user profiles, allowing credential based access to sequence for activation signals, calculating performance of the user based on the interpreted user actions and a set of pre-specified parameters. The information associated with the actions included in the preceding sentence, is typically stored in the storage means 132 or may be accessed from the external storage media. The pre-specified parameters, in various implementations, may include a) the number of times the user action on a sensor(s) results in an output signal that is associated with the sensor(s) requiring the user action, or b) the percentage between the number of times the user action on a sensor(s) results in an output signal that is associated with the sensor(s) requiring the user action and the total number of user actions, or c) the number of times the user action on a sensor(s) results in an output signal that is associated with the sensor(s) requiring the user action within a pre-defined time such as 10 seconds, or 20 seconds, or 30 seconds, etc., or f) the time it takes for a user to take a pre-defined number of user actions, like 10 user actions, or 20 and so on, on a sensor(s) resulting in an output signal that is associated with the sensor(s) requiring the user action. The storage means records the calculated performance and maintains an accessible performance-log of the user. The accessible log allows for review and analysis of a user performance over a period of time.

In an embodiment, none of the sensor units (102 . . . 102") receive the activation signal. In fact, the processing unit 104 indicates one or more of the sensor units that require a user action. For example, the perceivable effect generator 140, which in this instance may be a speaker, indicates the sensor unit number that requires the user action. The user action on the sensor unit requiring the user action generates the action signal, which is then interpreted by the interpretation module and an output signal is generated, in accordance with the interpretation. Therefore, in this embodiment, it is not necessary that the perceivable effect, produced by the activation signal, indicating the at least one sensor that requires the user action is produced at the sensor unit itself. Rather, it can be produced at the processing unit or to an external speaker system communicatively connected with the processing unit.

In accordance with the embodiment of the preceding paragraph, a system for improving bodily dexterity is disclosed. The system includes a plurality of wearable sensor units (102 . . . 102') and a processing unit 104. The sensor unit, individually, includes a sensor 110 adapted to sensing a user action, a generating module 112 adapted to generating an action signal that includes information about the user action performed on at least one of the plurality of sensor units, a sensor transmitter 118 adapted to transmitting the action signal. The processing unit 104 includes an activation signal generator 136, which in other embodiment may be the output signal generator 134 that is configured to also generate the activation signal, for generating an activation signal, the activation signal indicating at least one sensor of the plurality of sensor units requiring the user action; a processing unit receiver 128 adapted to receiving the action signal, an interpretation module 126 adapted to interpreting the action signal in accordance with a set of pre-assigned criteria, an output signal generator 134 adapted to generating an output signal based on the interpreted action signal. As a variation to this embodiment, the processing unit 104 comprises a processing unit transmitter 124 adapted to transmitting an activation signal to an electronic device (refer FIG. 4, 404 or 406) and/or the at least one of the plurality of sensor unit. In another embodiment of this variation, each of the plurality of sensor unit comprises a sensor receiver 120, in each of the plurality of sensors, adapted to receiving the activation signal that indicates at least one of the plurality of sensor units requiring the user action.

Although, until now, the invention describes a system where the processing unit is separate from the sensor unit but in an embodiment, the processing unit is integrated within one of the plurality of sensor units.

FIG. 6 illustrates a clothing accessory according to an embodiment of the invention. The clothing accessory 605, 605' includes a means 610, 610' for attaching the at least one sensor unit of the plurality of sensor units (102 . . . 102') and/or the processing unit 104. The clothing accessory may include a shirt, t-shirt, trousers, leggings, cap, gloves, mitten, socks, shoes, scarf, etc. The attaching means is selected from a fixed attaching mechanism, such as a stitch mechanism, and a re-attachable mechanism such as a hook-and-loop mechanism, magnetic mechanism, hook-and-loop mechanism, etc. The sensor unit/processing unit include complimentary part of the attaching means. For example, in a hook-and-loop assembly, the clothing means may include the hook part whereas the sensor unit/processing unit may include the complimentary loop part. The clothing accessory may also include a clip-on sensor unit to be fitted in shoes as well or even a shoe with the attaching mechanism. In an embodiment, the clothing accessory is made of a conventional clothing material. However, it is preferred that the clothing material produces a specific tactile sensation in response to the received output/collective output signal. In other embodiments, the clothing accessory includes mechanisms, such as in tactile gaming vests that are invoked as a response to the output/collective output signal, resulting in production of tactile sensations.

Figure 7:
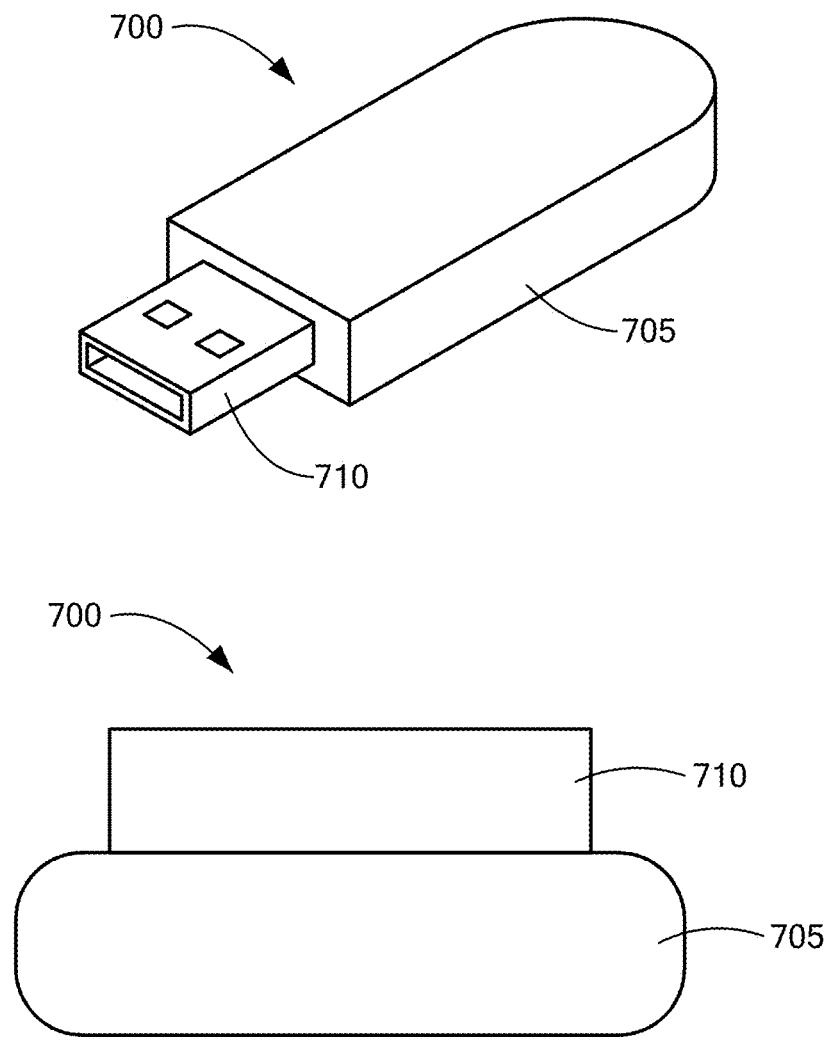
FIG. 7 illustrates a pluggable means according to an embodiment of the invention.
Figure 8:
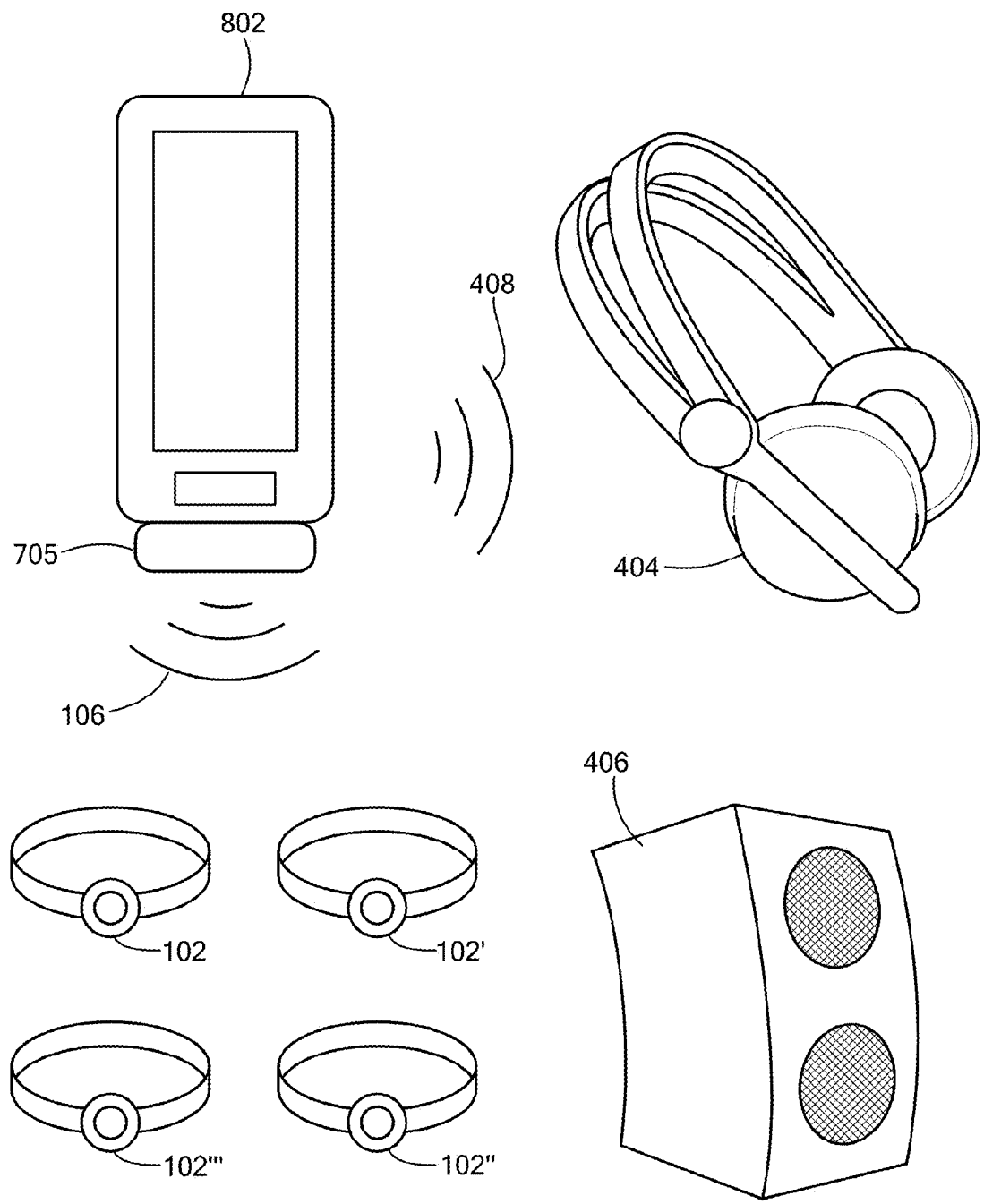
FIG. 8 illustrates the pluggable means integrated with an electronic device according to an embodiment of the invention.
Figure 9:
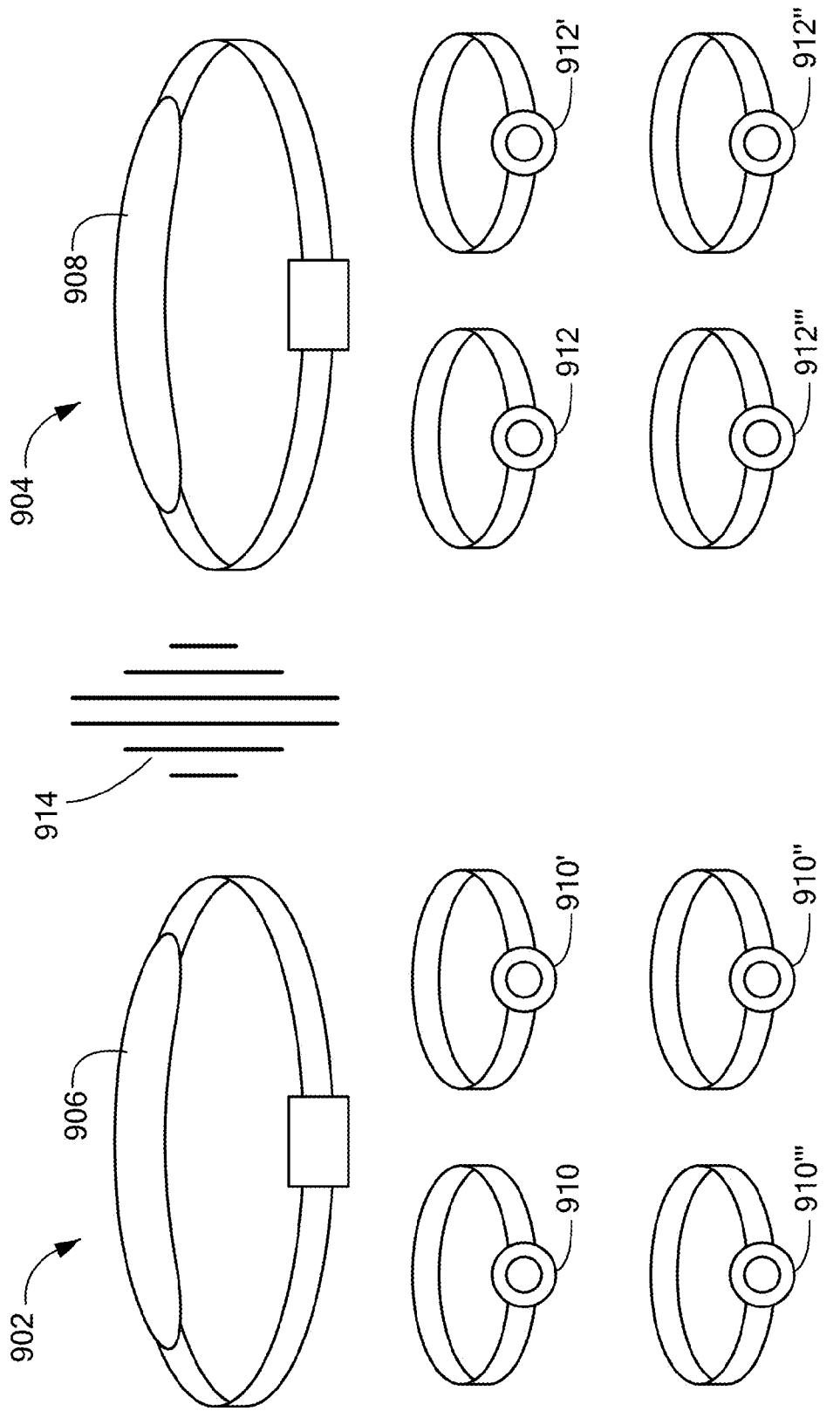
FIG. 9-12 illustrates a combined system according to various embodiments of the invention.

FIG. 7 illustrates a pluggable means according to an embodiment of the invention and FIG. 8 illustrates the pluggable means integrated with an electronic device according to an embodiment of the invention. In an embodiment, a pluggable means 700, such as a dongle, having a connectable end 710 adapted to coupling with an electronic device 802 (refer FIG. 8) is disclosed. The pluggable means includes executable instructions in order to provide a set of functionality of the processing unit to the electronic device such as a portable smartphone. Thus, the integrated pluggable means with the electronic device is configured to operate like the processing unit 104 when communicatively interfaced 106, with wired or wireless connection, with the plurality of sensor units 102-102''''.

The pluggable means also includes a housing 705 having the connectable end 710, which includes a plurality of contact pins for connecting to the electronic device. The executable means, when executed, allow the integrated pluggable means with the electronic device along with the plurality of sensor units to perform the functionality of the system 100 as described in various embodiments of the description. The output signal may produce perceivable effect on the device itself 802 or may invoke functions via communication connection 408 at the device 404 and 406. The communication connection may also be a wired connection, such as connecting audio out port of the electronic device 802 with audio in port of a hi-fi audio system using a cable or connecting via a docking station.

Figure 10:
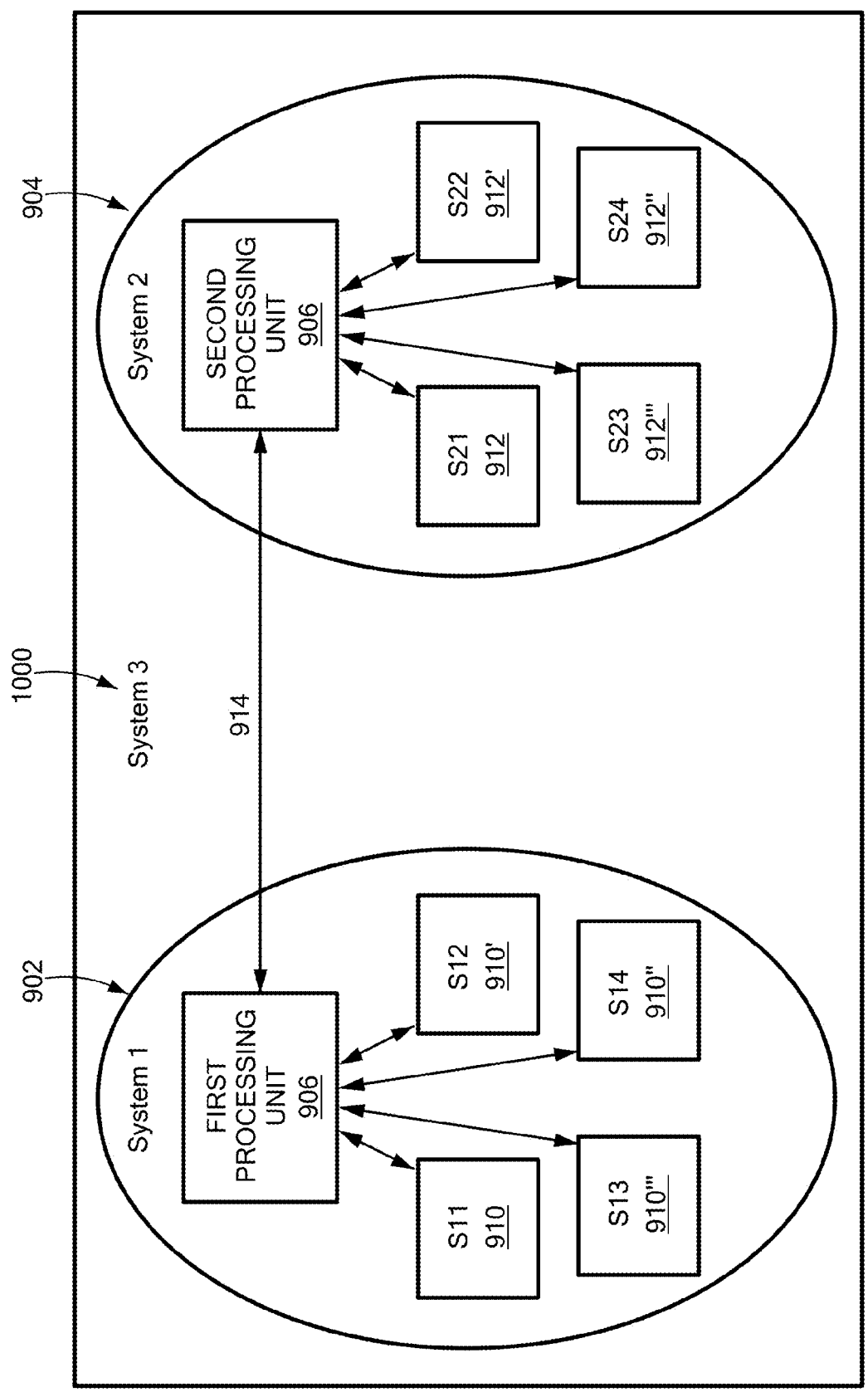

FIGS. 9-12 illustrate a combined system according to different embodiments of the invention. The combined system includes a first system (system) 902 and a second system (another system) 904, where the first system 902 and the second system 904 individually include features of the system 100 described in various embodiments of the description section. In particular, the first system 902 includes a first plurality of sensor units 910-910''' and a first processing unit 906; and the second system 904 comprises a second plurality of sensor units 912-912''' and a second processing unit 908. The first processing unit 906 communicates with the first plurality of sensor units 910-910'''; and/or the second processing unit 908 communicates with the second plurality of sensor units 912-912'''. The first processing unit 906 of communicates with the second processing unit 908 via a communication connection 914. The combined system 1000 is represented in FIG. 10. Although the combined system is described with a two system set up but the same principle is applicable for multi-system set up where the systems of the multi-system set up are communicatively connected with one another In one embodiment, the first processing unit 906 and the second processing unit 908 has activation table stored individually in respective storage means and selecting the same or different activation signal sequence in each of the systems would allow indication of at least one sensor of the firstly plurality of sensor units 910-910''' requiring user action and also indication of at least one sensor of the second plurality of sensor units 912-912''' requiring user action. In another embodiment, the first processing system 906 acts like a master processing unit and the second processing unit 908 acts like a slave to the first processing unit 908 (refer FIG. 11B, where there is only unidirectional flow of information from the first system 902 to the second system 904), which transmits the activation signal to the second processing unit and the second processing unit then transmits the same to indicate one of the plurality of second sensor units 912-912''' that require the user action. Thus, the activation signals are transmitted from the first processing unit to the first plurality of sensor units and the activation signal is transmitted from the second processing unit to the second plurality of sensor units. In one embodiment, considering that all player having a specific game on their processing unit, all players have the same sound files locally available on their processing unit. By controlling the start signal, the Master processing unit, may play the same file in sync, if needed. This would enhance the perceived loudness and sound experience in the game.

Figure 11A:
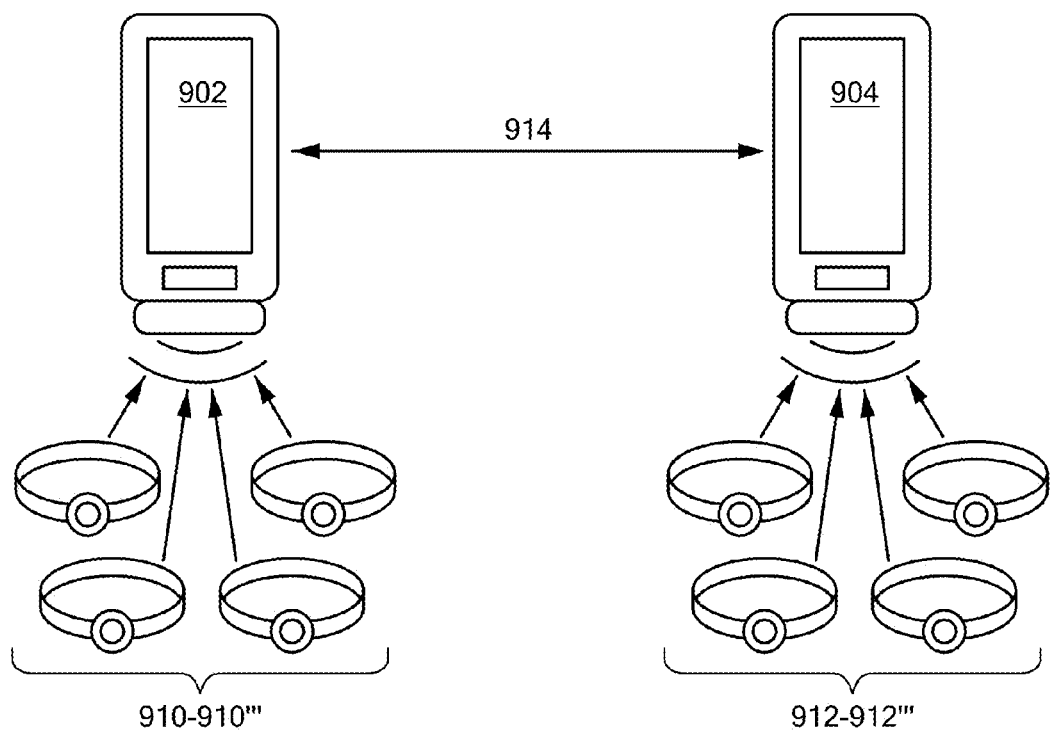
Figure 11B:
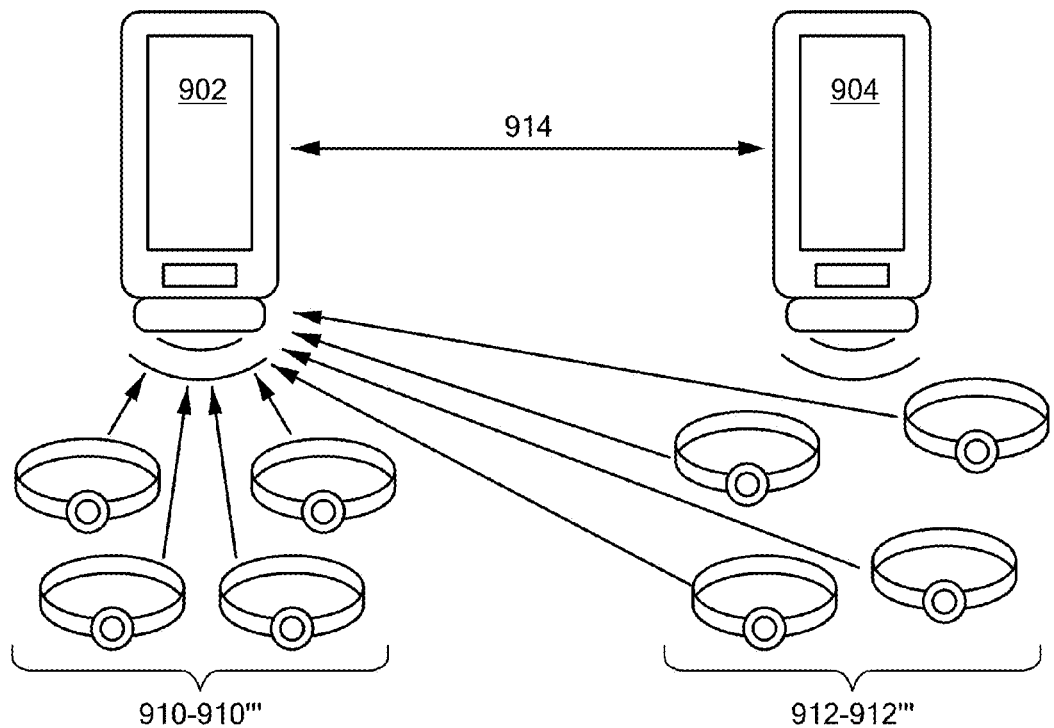
Figure 11C:
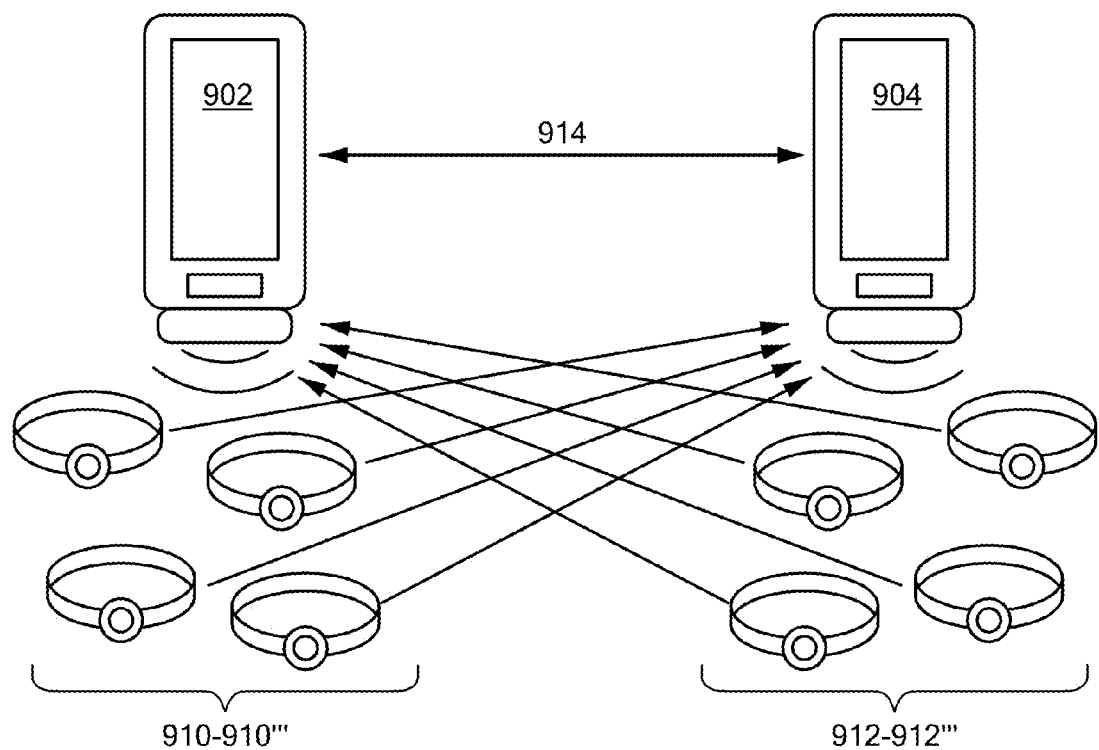

In various embodiments, only the first processing unit 906 of the system receives the action signal from at least one of the second plurality of sensor units 912-912''' that were indicated to be requiring the user action (refer FIG. 11B). In another embodiment, as illustrated in FIG. 11C, the first processing unit 906 of the first system 902 receives the action signal from at least one of the second plurality of sensor units 912-912'''; and the second processing unit 908 of the another system 904 receives the action response from at least one of the first plurality of sensor units 910-910'''. In yet another embodiment, as illustrated in FIG. 11A, the first processing unit 906 of the system receives the action signal from at least one of the first plurality of sensor units 910-910'''; and the second processing unit 908 of the another system 904 receives the action response from at least one of the second plurality of sensor units 912-912'''. In various scenarios, the processing unit receiving the action signal is responsible for interpreting the received action signals and generating the output signals.

In a combined system; the user action is performed on the sensor, indicated to be requiring user action, of the plurality of sensor units that are worn by the other user(s). As an illustration from FIG. 2C, in a combined system where a first user wears the first plurality of sensor units (102a, same as 910) and a second user wears the second plurality of sensor units (102b, same as 912), the first user action needs to be performed on at least one sensor, indicated to be requiring user action, of the second plurality of sensor units. Similarly, the second user action needs to be performed on at least one sensor, indicated to be requiring user action, of the first plurality of sensor units. For example, if two touch sensors of the second plurality of sensors flash perceivable effect (say red light) indicating requirement of a user action, then the first user needs to touch the two touch sensors. Similarly, if one touch sensors of the first plurality of sensors flash perceivable effect (say red light) indicating requirement of a user action, then the second user needs to touch the one touch sensor. Therefore, the first plurality of sensor units 910-910''' are mounted on the first user; and the second plurality of sensor units 912-912''' are mounted on the second user. In use, the first plurality of sensor units 910-910''' sense the user action from the second user; and the second plurality of sensor units 912-912''' sense the user action from the first user. For simplicity of explanation reasons, the combined system is defined in terms of two communicatively connected systems—the first system and the second system. However, one would appreciate that the disclosed working principle is applicable in a multi-system situation as well.

While using the combined system, among two or more users, the users usually face toward one another (refer FIG. 2C) and in addition to attaining bodily movement, they are also able to interact in a competitive, yet friendly, environment. The relative performance, as interpreted by the interpretation module of individual processing unit or the processing unit of the master determines the higher performing user.

Figure 12:
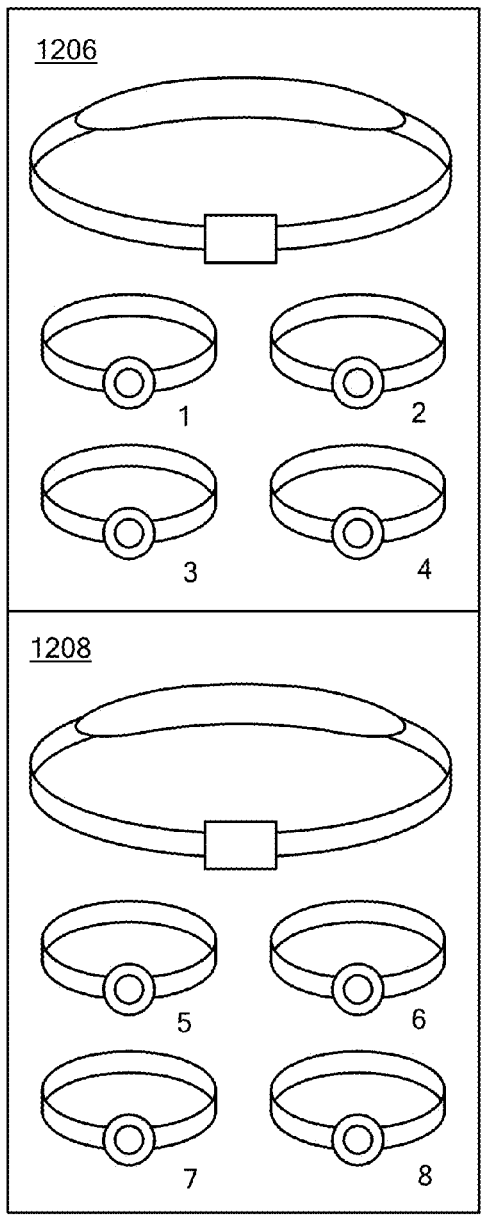
Figure 12:
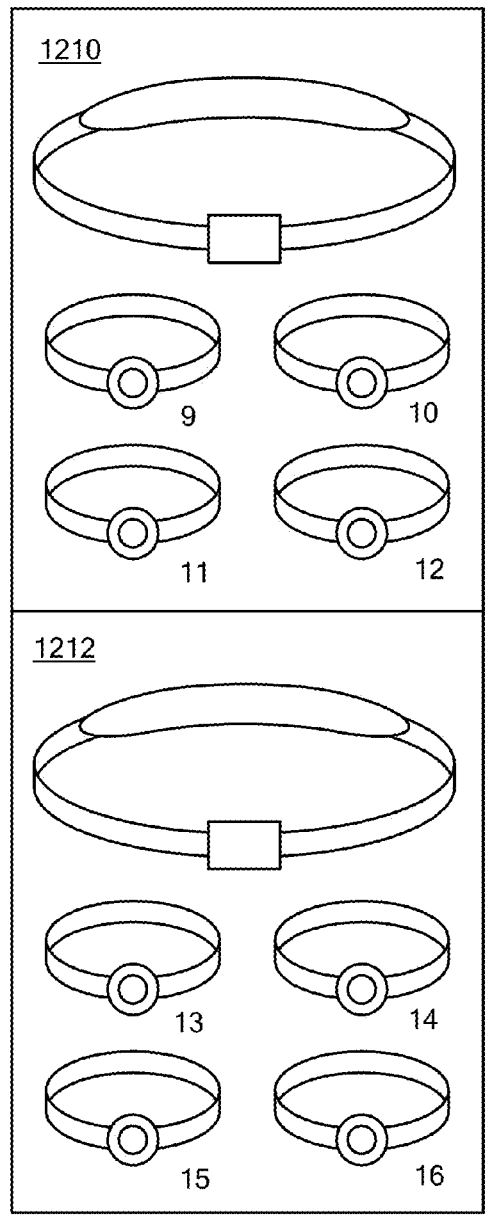

FIG. 12 illustrates a combined system in a multi user scenario according to an embodiment of the invention. In an embodiment, the combined system is useable in groups as a multiuser system 1202, where one group represents team 1 and the other team represents team 2. Individual systems 1206, 1208, 1210, 1212, as shown, have the properties of the system 100. The communication among the individual systems is based on the functioning of system 100 and the communication connection and role of individual systems is configurable to represent the combined system of various embodiments, as described in FIGS. 9-11. However, the first user action is now defined by user action performed by team 1 members on the sensor units of the team 2 and the second user action is defined by user action performed by team 2 members on the sensor units of the team 1. The relative performance, as interpreted by the interpretation module of individual processing unit or the processing unit of the master determines the higher performing team. In other embodiments, more users in each group may be included. Similarly more number of group may also be formed.

Figure 13:
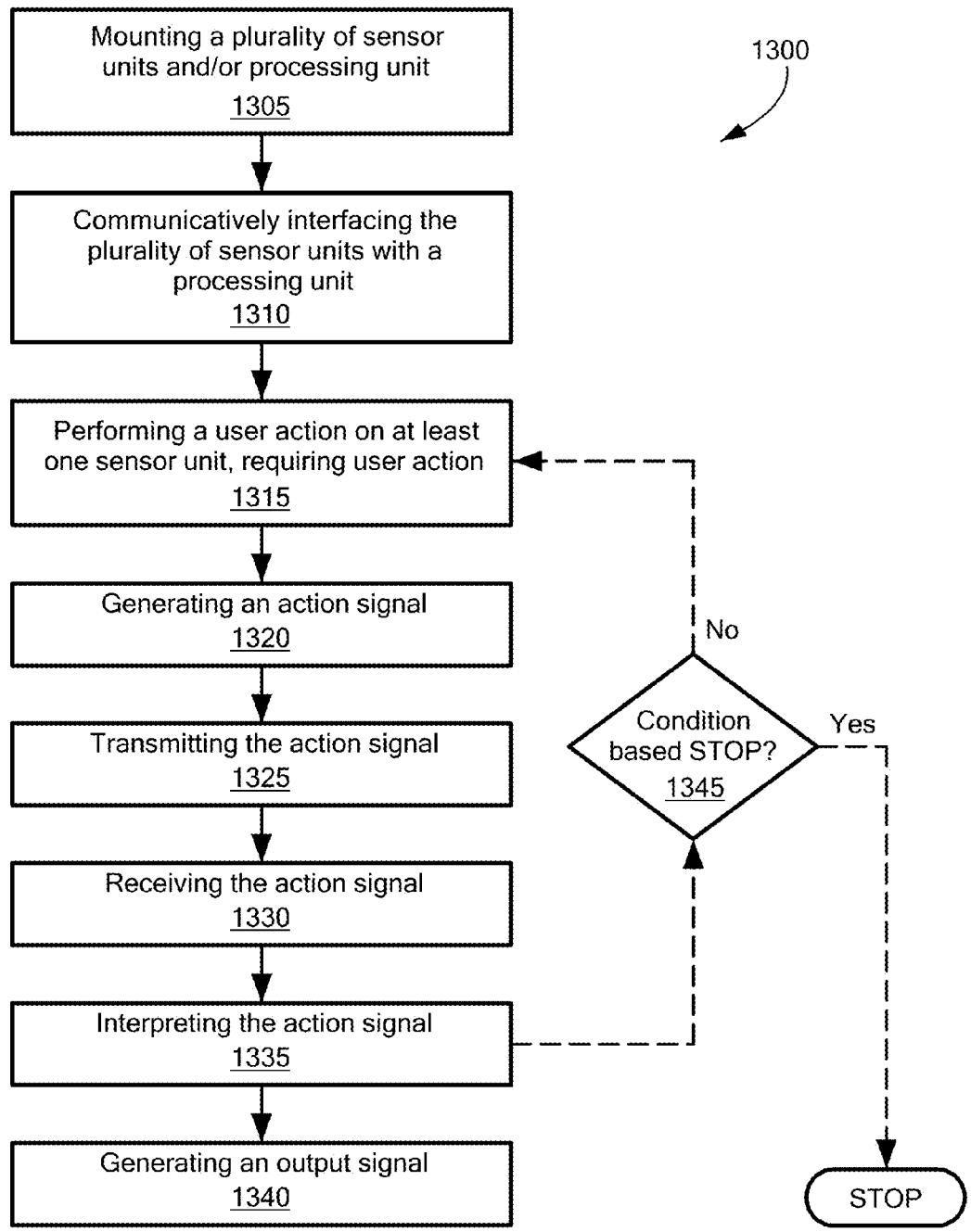
FIG. 13 illustrates a method for improving bodily dexterity according to an embodiment of the invention.

FIG. 13 illustrates a method 1300 for improving bodily dexterity according to an embodiment of the invention. The method includes mounting a plurality of sensor units on at least a body part of a user at 1305, communicatively interfacing the plurality of sensor units with a processing unit at 1310, performing a user action on at least one sensor unit of the plurality of sensor units at 1315, generating an action signal that includes information about the user action at 1320, transmitting the action signal to a processing unit at 1325, receiving the action signal at the processing unit 1330, interpreting the action signal in accordance with a set of pre-assigned criteria at 1335; and generating an output signal based on the response signal at 1340. The output signal will produce a perceivable effect. The effect, in various embodiments, may be performed at the sensor units, at the processing unit, at an external device, or in combination of any of the sensor unit, processing unit or external device. The method may also include determining at 1345 whether the condition for generating further action signal is met. If not, then the user performs subsequent action in order to generate a series of action signals and a series of output signals. If the condition is met, then the method is stopped. In another embodiment, additional steps are included. These steps include transmitting an activation signal to the at least one sensor unit of the plurality of sensor units at 1405 (refer FIG. 14); and receiving the activation signal at the at least one sensor unit requiring the user action at 1410 (refer FIG. 14), the activation signal indicating the at least one sensor unit requiring the user action.

In another embodiment of the invention, a system 100 includes a plurality of wearable sensor units 102 . . . 102', were each of the sensor unit includes a sensor receiver 120 adapted to receiving the activation signal that indicates at least one of the plurality of sensor units requiring the user action, a sensor adapted to sensing a user action, a generating module 112 adapted to generating an action signal that includes information about the user action performed on at least one of the plurality of sensor units, a sensor transmitter 118 adapted to transmitting the action signal. The system also includes a processing unit 104 having a processing unit transmitter 124 adapted to transmitting an activation signal, a processing unit receiver 128 adapted to receiving the action signal, an interpretation module 126 adapted to interpreting the action signal in accordance with a set of pre-assigned criteria, and an output signal generator 134 adapted to generating an output signal based on the interpreted action signal.

Figure 14:
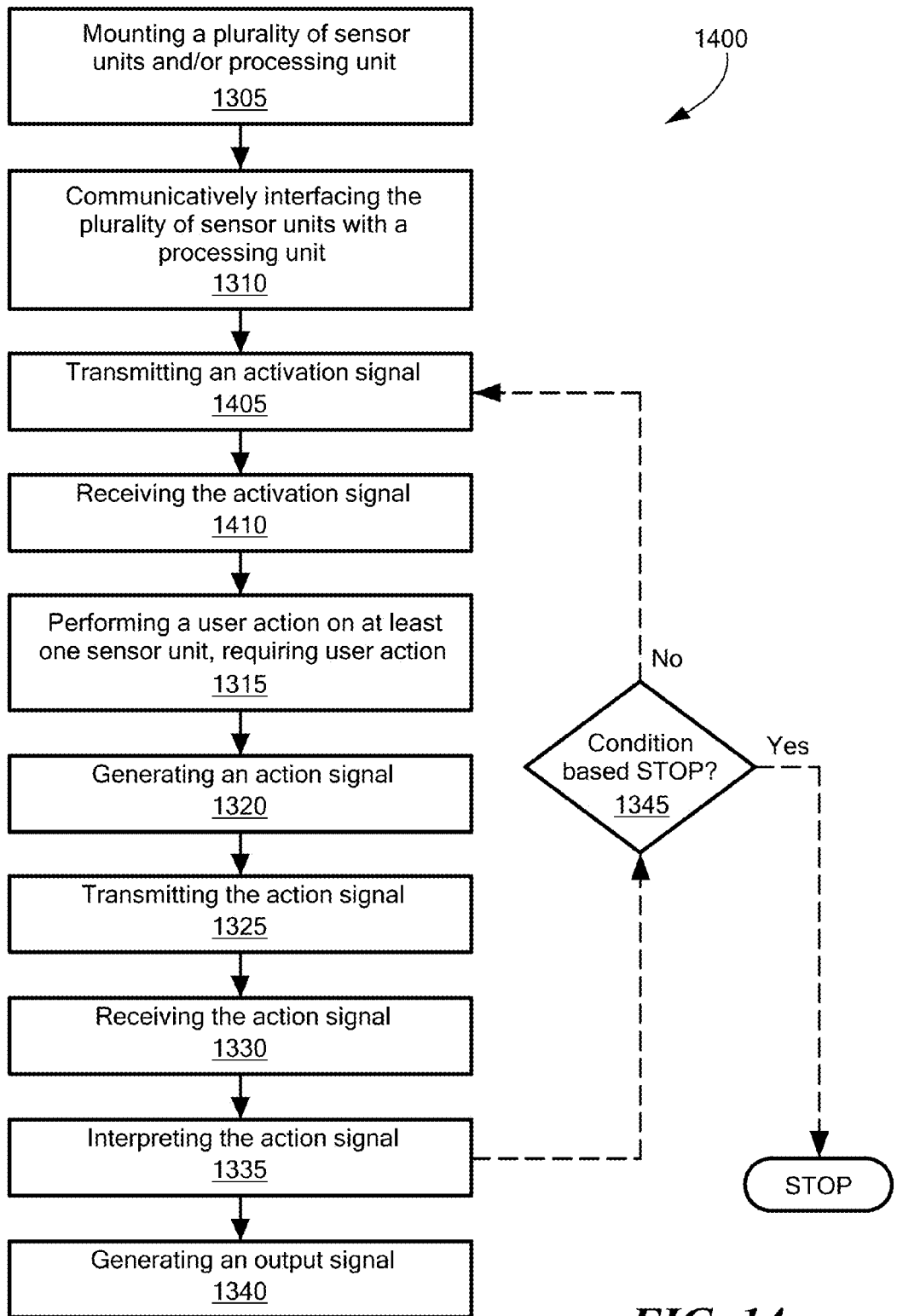
FIG. 14 illustrates a method for improving bodily dexterity according to another embodiment of the invention.

FIG. 14 illustrates a method 1400 for improving bodily dexterity according to another embodiment of the invention. The method includes mounting a plurality of sensor units at 1305 on at least a body part of a user, communicatively interfacing the plurality of sensor units with a processing unit at 1310, transmitting at 1415 an activation signal to the at least one sensor unit of the plurality of sensor units wherein the activation signal indicating the at least one sensor unit requiring the user action, receiving at 1410 the activation signal at the at least one sensor unit requiring the user action, performing at 1315 a user action on at least one sensor unit requiring the user action, generating at 1320 an action signal that includes information about the user action, transmitting at 1325 the action signal to a processing unit, receiving at 1330 the action signal at the processing unit receiver at 1330, interpreting at 1335 the action signal in accordance with a set of pre-assigned criteria, and generating at 1340 an output signal based on the response signal. The method may also include determining at 1345 whether the condition for transmitting further activation signal action signal is met. If not, then subsequent activation signal is transmitted and the user performs subsequent action in order to generate a series of action signals and a series of output signals. If the condition is met, then the method is stopped. The output signal will produce a perceivable effect. The effect, in various embodiments, may be performed at the sensor units, at the processing unit, at an external device, or in combination of any of the sensor unit, processing unit or external device.

In another embodiment of the invention, a method for improving bodily dexterity is disclosed. The method includes mounting a first plurality of sensor units of a first system on at least a body part of a first user, mounting a second plurality of sensor units of a second system on at least a body part of a second user, communicatively interfacing the first plurality of sensor units with a first processing unit, communicatively interfacing the second plurality of sensor units with a second processing unit; and communicatively connecting a first processing unit of the first system with a second processing unit of the second system.

In yet another embodiment, a plurality of sensor units set up is disclosed. More than one sensor of the plurality sensor units are adapted to sense a user action performed, simultaneously/substantially simultaneously or within a specified time period or as an overlapping action, on the more than one sensor requiring user action. A collective output signal generated corresponding to the sensing of more than one user action is different from an output signals generated for individual sensors of the more than one sensors if the individual sensors sense the user action outside the requirement of user action performed simultaneously/substantially simultaneously or within a specified time period or as the overlapping action.

In yet another embodiment, a method relating to more than one sensors of the plurality of sensor unit is disclosed. The method includes performing, simultaneously/substantially simultaneously or within a specified time period, a user action on more than one sensor of a plurality of sensor units; and generating a collective output signal based on a collective interpretation of the more than one user action performed simultaneously/substantially simultaneously or within a specified time period or as an overlapping action. A collective output signal generated corresponding to the sensing of more than one user action is different from an output signals generated for individual sensors of the more than one sensors if the individual sensors sense the user action outside the requirement of user action performed simultaneously/substantially simultaneously or within a specified time period or as overlapping user action.

The method may further include generating an action signal from each of the sensor unit, relating to the more than one sensor, of the plurality of sensor units, thereby collectively producing more than one action signal, transmitting the action signal from each of the sensor unit, relating to the more than one sensor, of the plurality of sensor units, thereby collectively transmitting more than one action signal, receiving the more than one action signals simultaneously/substantially simultaneously or within the specified time period or as an overlapping signal at a processing unit; and collectively interpreting the more than one action signal in accordance with the set of pre-assigned criteria.

In yet another embodiment, a pluggable means (refer FIGS. 7 and 8) is disclosed. The pluggable means 700, such as a dongle, includes a connectable end 710 adapted to couple with an electronic device 802, the pluggable means comprising executable instructions in order to provide a set of functionality of the processing unit (refer FIG. 1, 104) to the electronic device such as a portable smartphone, tablets, pcs, etc. In the scenario where the pluggable means is used with the pc or similarly sized electronic device, the portability, as defined by the invention, will be affected. The integrated pluggable means 700 with the electronic device 802 is configured to operate like the processing unit 104 when communicatively interfaced with the plurality of sensor units (102 . . . 102').

In yet another embodiment, a clothing accessory (refer FIG. 6) is disclosed. The clothing accessory 605, 605' includes a means 610, 610' for attaching at least one sensor unit of a plurality of sensor units and/or the processing unit.

The clothing accessory may include any of shirt, t-shirt, trousers, leggings, cap, gloves, mitten, socks, shoes, scarf, etc. The attaching means is a fixed attaching mechanism, such as a stitch mechanism, or a re-attachable mechanism such as a hook-and-loop mechanism. The sensor unit/processing unit include complimentary part of the attaching means. For example, in a hook-and-loop assembly, the clothing means may include the hook part whereas the sensor unit/processing unit may include the complimentary loop part. In an embodiment, the clothing accessory is made of a material that produces a specific tactile sensation in response to the received output/collective output signal. In other embodiments, the clothing accessory includes mechanisms, such as in tactile gaming vests, that are invoked as a response to the output/collective output signal, resulting in production of tactile sensations.

There are various applications of the disclosed system, according to various embodiments of the invention.

Performance

The overall gaming category covers games that can be played using the disclosed system. The focus lies on music, dance and performance, such as stage performance. The system is used as a body instrument where the game is driven by fun performance itself. Some of the variations may include Moving Tones This sub-category covers games where the sensor units are used for producing musical tones, thus allowed for playing melodies. Depending upon the associated output signal, the system may be used as a body piano, synthesizers, bass, guitar, chords, singing words, etc.

Beat Box

This sub-category covers games where the sensor units are used for percussive non tonal sounds such as drums, sound effect or spoken words. Depending upon the associated output signal street dance beat box, rap/poetry, stomp maniac, etc. may be generated.

Remix Rides

This sub-category covers games where famous songs (i.e. pop, rock, hip-hop etc) is chunked up in samples, background loops and with new remix elements, i.e. a mix between tones and percussive elements. This makes it possible to make a cool remix of famous songs while the user is dancing—a remix in flow. The associated generated output signal invokes functions allowing for such chunking up effects.

Mashup Moves

This sub-category covers games where two famous songs are chunked up in samples which match in tempo and key. This makes it possible to make a cool mashups of famous songs, while you are dancing, i.e. mashup-in flow. The associated generated output signal invokes functions allowing for such chunking up effects.

Customize Performance

This sub-category covers games which allow the user to make customized performances. For example, record and edit user's sensor unit sample music and background music loop. Also, customizing and controlling the movement along different sensors based on activation signal is also possible.

Competition Games

This overall gaming category covers games with an element of competition. Here the game allows competing with oneself and also competing with others.

Turn Off that Light

This game is about turning off lights (perceivable activation signal effect) on the sensor unit by touching them. The level of difficulty will increase during the game by means of tempo and demanding combination of touching more than one sensor units that light up together by the activation signal. The game may be played as a solo-player or multi-player, where several players start in sync thereby creating the competitive pressure on the players.

How Fast Can You Go

This game is about speed, coordination and endurance. The game is structured in different levels. For each level, a fixed sensor unit combination sequence is shown, for example sensor unit 1-3-2-4. In order to create a sequence of action signals, the user must take user actions with a fixed sequence. For each level, the player gets x seconds (for example 15 seconds) to make as many user actions as possible. The game may be played both as a solo-player or multi-player. In multi-player mode, each level countdown is started synchronically. The game may also be played as team battles (refer FIG. 12) where the fix sensor unit sequence dictates the team players to cooperate in order to create action signal.

Follow that Rhythm

This musical game is about repeating melodies or rhythmic figures and getting points for correctly taking user action on the sensor units. The game plays rhythmic sequences, which will increase in level of difficulty. The player gets points after how many correct user actions the user is able to repeat from each sequence.

How Far Can You Go

This game is about memorizing and repeating the rhythm sequence of two hits to copy. While taking correct user action, the figure will expand to a sequence of two hits to copy. When taking correct user action, the figure will expand to rhythm sequence of 2+1, which needs to be repeated and so forth. Taking wrong user action will result in game getting over. The game can be played as multi-player, where the players start the game synchronically.

Build a Beat

A loop figure is played over 1-4 bars dependent on the level of difficult. When correct user action on the sensor unit is taken, it start loop and the next musical layer will be presented. This continues until the condition of all instruments being playing. The points is given according to time spend and number of incorrect user actions.

Drum Battle

This is a two player musical game, which is about strategy, sense of rhythm and repeatability. The game is build up around a challenger and a repeater. The challenger starts playing and a rhythmic sequence of 1-2 bars. The repeater shall now duplicate the challenge. If the repeater does it correctly by taking user actions on the sensor units, then the repeater gets points. Many other pointing systems may be employed.

Stop Dance

In this multiplayer game a group of players dance to a synchronized piece of music from a speaker. When the music stops at random, one sensor unit of each player will start producing perceivable effect like light. The player who turns off by taking user action on his lighted sensor unit the last is eliminated for the next round. Performing user action on unlighted sensor units also results in elimination.

Starlight

This game is about playing a famous song rhythmically correct. Visual activation signals on the processor unit screen or lighting activation signals on the sensor unit as well as audio output will guide the player how to play the famous song. The player will get points in accordance with the performance.

Touch Fight

This multiplayer game is about speed, strategy, and physical strength. Two players face each other and the game is about touch the other users' sensor units thereby-scoring points.

Sound Tag

Tag is a children game in which one chases the rest and anyone who is touched then becomes the pursuer. A number of players with the system are gathered in a defined square. The chaser then needs to touch the other players' sensor unit. A person whose sensor unit is touched, then the person whose sensor unit is touched becomes the pursuer. The system allows to tracking time and listing players in terms of time taken to chase.

The system may be used in multi-player hide-and-seek, using to play tunes of famous songs, and also for educational purposes, for example learning alphabets by assigning, learning grammar and music theory, controlling game elements in a console based games or opening/closing executable files through mobile apps, etc. The required user action on the sensor units are assigned through associated output signal, which invokes a learning module function.

Sport

This gaming category covers games where focus is on burning calories and strengthening muscles.

Fitness Combat

In this sub-category, a user of the system will touch the sensor mounted on body parts that are usually touched during stretching exercises. During the workout, the processing unit will count the number times, the user correctly touched the sensor unit. This technique may be used in a group and the one with highest correct touches on his respective sensor unit will be declared as a winner.

Medical

This gaming category covers games where focus lies on different kinds of rehabilitation.

Physiotherapy

The system may be used within physiotherapy where a physiotherapist may design special games with focus on training particular muscle group as a part of a fun game. The designed game may include moving the muscle group in order to touch the sensor unit.

On Body Language

The system may be used as a practical communication tool in everyday life for handicapped with different speech disorders. By associating user action on the sensor unit with audio files like Eat, Yes, No, etc., the handicapped person will have a smart communication tool.

Music Therapy

Because the system is a adapted to produce a mix of sound though user action, include body movements; it may be used by educators in music therapy while communicating with intellectual disability.

It is important to note that FIGS. 1 to 14 illustrate specific applications and embodiments of the invention, and it is not intended to limit the scope of the present disclosure or claims to that which is presented therein. Throughout the foregoing description, for the purposes of explanation, numerous specific details, such as four sensors of a plurality of sensor units, an elastic mounting means, sensor units usually in front facing orientation, etc. were set forth in order to provide a thorough understanding of the invention. It will be apparent, however, to one skilled in the art that the invention may be practiced without some of these specific details and by employing different embodiments in combination with one another. The underlying principles of the invention may be employed using a large number of different combinations.

Accordingly, the scope of the invention should be judged in terms of the claims which follow.

The invention claimed is:

1. A system comprising
   a) a plurality of wearable sensor units comprising
      i) a sensor, in each of the plurality of wearable sensor units, adapted to sensing a user action,
      ii) a generating module, in each of the plurality of wearable sensor units, adapted to generating an action signal that includes information about the user action performed on at least one of the plurality of wearable sensor units,
         wherein more than one sensor of the plurality of wearable sensor units are adapted to sense the user action performed substantially simultaneously on more than one sensor;
      iii) a sensor transmitter, in each of the plurality of wearable sensor units, adapted to transmitting the action signal;
      iv) a sensor receiver, in each of the plurality of wearable sensor units, adapted to receiving an activation signal from a processing unit transmitter indicating that at least one of the plurality of wearable sensor units requires a user action;
   and
   b) a processing unit comprising
      i) a processing unit receiver adapted to receiving an action signal,
         wherein the processing unit receiver is capable of receiving substantially simultaneously more than one action signal;
      ii) an interpretation module adapted to interpreting the action signal in accordance with a set of pre-assigned criteria,
         wherein the interpretation module is capable of collectively interpreting the more than one action signals in accordance with the set of pre-assigned criteria; and
      iii) an output signal generator adapted to generating an output signal comprising instructions for producing a perceivable effect based on the interpreted action signal,
         wherein the output signal generator is capable of generating a collective output signal comprising instructions for producing a perceivable effect based on the collective interpretation of more than one action signal, and
         wherein a collective output signal is different from the output signals generated for individual sensors sensing a user action outside of the requirement of a substantially simultaneously performed user action,
      iv) a processing unit transmitter adapted to transmitting an activation signal to a sensor receiver of a wearable sensor unit indicating that at least one of the plurality of wearable sensor units requires a user action;
         wherein the activation signal comprises instructions for producing a perceivable effect on the at least one of the plurality of wearable sensor units,
         wherein the produced perceivable effect indicates that at least one of the plurality of wearable sensor units require a user action;
         wherein the plurality of wearable sensor units are individually adapted to produce the perceivable effect in accordance with the output signal, or the collective output signal, generated by the output signal generator of the processing unit and comprising instructions for producing said perceivable effect.

2. The system according to claim 1, wherein the processing unit is wearable.

3. The system according to claim 1, wherein the plurality of wearable sensor units and the processing unit are portable.

4. The system according to claim 1, wherein the plurality of wearable sensor units and/or the processing unit individually comprises a mounting means for mounting the plurality of wearable sensor units and/or the processing unit on a body part of the user.

5. The system according to claim 1, wherein the perceivable effect is selected from a group consisting of a number of visual effects, a number audio effects, a number of smoke effects, a number of vibrational effects, variation in the perceivable effect and a combination thereof.

6. The system according to claim 1, further comprising a device that is communicatively connected to the processing unit and is capable of producing the perceivable effect.

7. The system according to claim 1, wherein more than one sensor of the plurality of wearable sensor units are adapted to sense the user action performed, within a specified time period, or as an overlapping user action, on the more than one sensor.

8. The system according to claim 1, wherein the sensor in each of the plurality of wearable sensor unit is selected from a group consisting of pressure sensor, tactile sensor, level sensor, proximity sensor, touch sensor, motion sensor, piezo electric sensor, mechanical button, digital button, vibration sensor, accelerometer, micro-gyros, 3-D compass, audio sensor and a combination thereof.

9. The system according to claim 1, wherein the processing unit comprises a user interface for selecting the activation signal.

10. The system according to claim 9, wherein the user interface is selected from a group consisting of physical buttons, graphical touch screen, and a combination thereof.

11. The system according to claim 1, further comprising a first power source in each of the plurality of wearable sensor units.

12. The system according to claim 11, wherein the processing unit comprises a second power source.

13. The system according to claim 12, wherein the first power source and the second power source are batteries.

14. The system according to claim 1, wherein the processing unit comprises a storage means for storing information included in the action signal, and information to be associated with the output signal.

15. The system according to claim 1, wherein the processing unit comprises a storage means for storing information included in the activation signal.

16. The system according to claim 1, wherein the processing unit is communicatively connected to a storage device, the processing unit being adapted to download data from the storage device and to upload information to the storage device.

17. The system according to claim 16, wherein the communication connection communicatively connecting the processing unit and the storage device is selected from a group consisting of a wired connection and a wireless connection.

18. The system according to claim 1, wherein the processing unit is integrated within one of the plurality of wearable sensor units.

19. The system according to claim 1, further comprising a pluggable means comprising a connectable end adapted to couple with an electronic device.

20. The system according to claim 19, wherein the pluggable means comprises executable instructions in order to provide a set of functionality of the processing unit to the electronic device.

21. The system according to claim 19, wherein the pluggable means with the electronic device is configured to operate like the processing unit when communicatively interfaced with the plurality of wearable sensor units.

22. The system according to claim 19, wherein the electronic device is a portable smartphone.

* * * * *